(12) United States Patent
Pecchia et al.

(10) Patent No.: US 12,484,809 B2
(45) Date of Patent: Dec. 2, 2025

(54) ELECTROCARDIOGRAM-BASED BLOOD GLUCOSE LEVEL MONITORING

(71) Applicant: The University of Warwick, Coventry (GB)

(72) Inventors: Leandro Pecchia, Coventry (GB); Mihaela Porumb, Coventry (GB)

(73) Assignee: The University of Warwick, Coventry (GB)

( * ) Notice: Subject to any disclaimer, the term of this patent is extended or adjusted under 35 U.S.C. 154(b) by 597 days.

(21) Appl. No.: 17/639,000

(22) PCT Filed: Aug. 27, 2020

(86) PCT No.: PCT/GB2020/052055
§ 371 (c)(1),
(2) Date: Feb. 28, 2022

(87) PCT Pub. No.: WO2021/038229
PCT Pub. Date: Mar. 4, 2021

(65) Prior Publication Data
US 2022/0346676 A1    Nov. 3, 2022

(30) Foreign Application Priority Data

Aug. 30, 2019   (GB) .................................... 1912487

(51) Int. Cl.
*A61B 5/145*    (2006.01)
*A61B 5/00*    (2006.01)
(Continued)

(52) U.S. Cl.
CPC .......... *A61B 5/14532* (2013.01); *A61B 5/318* (2021.01); *A61B 5/7267* (2013.01);
(Continued)

(58) Field of Classification Search
CPC ... A61B 5/14532; A61B 5/318; A61B 5/7267; A61B 5/7278; A61B 5/7282;
(Continued)

(56) References Cited

U.S. PATENT DOCUMENTS 6,522,903 B1 * 2/2003 Berman ............. A61B 5/14514
600/316
6,572,542 B1 * 6/2003 Houben ................ G16H 50/20
128/920
(Continued)

OTHER PUBLICATIONS

International Search Report and Written Opinion issued Jan. 22, 2021 in corresponding International Application No. PCT/GB2020/052055.
(Continued)

*Primary Examiner* — Curtis J King
(74) *Attorney, Agent, or Firm* — NovoTechIP International PLLC

(57) ABSTRACT

A computer system for use in monitoring blood glucose level monitoring, the computer system configured, in response to receiving electrocardiogram data measured over a given period of time for a given subject, to classify the electrocardiogram data using at least one neural network and a personalised model which is specific to the given subject so as to identify whether a low blood glucose level condition is present wherein blood glucose level falls below a predefined level and, upon identifying the presence of the low blood glucose level condition, to flag an alarm condition.

31 Claims, 17 Drawing Sheets

(51) Int. Cl.
   *A61B 5/318*     (2021.01)
   *G16H 40/63*     (2018.01)
(52) U.S. Cl.
   CPC .......... *A61B 5/7278* (2013.01); *A61B 5/7282* (2013.01); *A61B 5/7285* (2013.01); *A61B 5/746* (2013.01); *G16H 40/63* (2018.01)
(58) Field of Classification Search
   CPC ....... A61B 5/7285; A61B 5/746; A61B 5/316; A61B 5/366; A61B 5/7235; A61B 5/7264; G16H 40/63; G16H 40/67; G16H 50/20; G16H 50/50; G16H 50/70; G16H 50/00
   See application file for complete search history.

(56) References Cited

U.S. PATENT DOCUMENTS

| | | | |
|---|---|---|---|
| 7,949,398 B1* | 5/2011 | Wenzel | A61N 1/36117 607/42 |
| 10,136,845 B2* | 11/2018 | Taub | G01N 33/48792 |
| 11,185,260 B1* | 11/2021 | Ehlert | A61B 5/14532 |
| 11,426,122 B2* | 8/2022 | Kamal | A61B 5/307 |
| 11,464,906 B2* | 10/2022 | Estes | A61M 5/14244 |
| 11,574,737 B2* | 2/2023 | Dharwad | G16H 40/63 |
| 11,672,446 B2* | 6/2023 | Hadad | A61B 5/14532 600/365 |
| 11,690,577 B2* | 7/2023 | Hampapuram | A61B 5/0004 600/365 |
| 11,857,304 B1* | 1/2024 | Baldwin | A61B 5/0507 |
| 11,957,875 B2* | 4/2024 | Zheng | G16H 40/40 |
| 11,969,579 B2* | 4/2024 | Mazlish | A61B 5/14532 |
| 11,998,324 B2* | 6/2024 | Southerland, III | A61B 5/14532 |
| 11,998,383 B2* | 6/2024 | Rajagopal | A61B 5/0022 |
| 2004/0167418 A1* | 8/2004 | Nguyen | A61B 5/7267 600/513 |
| 2005/0027183 A1* | 2/2005 | Sastre | A61B 5/14532 600/365 |
| 2006/0281980 A1* | 12/2006 | Randlov | G16Z 99/00 600/301 |
| 2009/0177068 A1* | 7/2009 | Stivoric | A61B 5/0022 600/365 |
| 2009/0287107 A1* | 11/2009 | Beck-Nielsen | A61B 5/37 600/544 |
| 2010/0274219 A1* | 10/2010 | Wenzel | A61B 5/388 607/3 |
| 2010/0280348 A1* | 11/2010 | Wenzel | A61B 5/14551 600/365 |
| 2010/0292634 A1* | 11/2010 | Kircher, Jr. | G16H 20/13 604/66 |
| 2013/0274580 A1* | 10/2013 | Madsen | A61B 5/7264 600/365 |
| 2014/0058218 A1* | 2/2014 | Randlov | A61B 5/0205 600/301 |
| 2014/0200426 A1* | 7/2014 | Taub | A61B 5/14532 600/347 |
| 2015/0245780 A1* | 9/2015 | Nguyen | A61B 5/364 600/365 |
| 2017/0079533 A1* | 3/2017 | Robinson | A61B 5/02116 |
| 2018/0160983 A1 | 6/2018 | Galloway et al. | |
| 2018/0233227 A1* | 8/2018 | Galloway | G16H 50/20 |
| 2018/0242892 A1* | 8/2018 | Schie | A61B 5/0205 |
| 2019/0246914 A1* | 8/2019 | Constantin | A61B 5/14532 |
| 2020/0008750 A1* | 1/2020 | Park | G06V 10/993 |
| 2020/0097777 A1* | 3/2020 | Goto | G06F 18/251 |
| 2020/0170578 A1* | 6/2020 | Park | A61B 5/7264 |
| 2020/0193326 A1* | 6/2020 | Leabman | H01Q 21/061 |
| 2020/0195293 A1* | 6/2020 | Leabman | A61B 5/0024 |
| 2020/0305709 A1* | 10/2020 | Chiang | G06T 7/0012 |
| 2021/0015431 A1* | 1/2021 | Kang | A61B 5/14532 |
| 2021/0145363 A1* | 5/2021 | Cho | A61B 5/6838 |
| 2021/0285909 A1* | 9/2021 | Lee | G06F 18/2193 |
| 2022/0005580 A1* | 1/2022 | Pavlov | A61B 5/486 |
| 2022/0051773 A1* | 2/2022 | Appelbaum | G16H 10/40 |
| 2022/0360913 A1* | 11/2022 | Stapf | A61B 5/14532 |

OTHER PUBLICATIONS

Great Britain Intellectual Property Office Combined Search and Examination Report issued Jan. 7, 2020 in corresponding Great Britain Application No. 1912487.4.

A. D. Association, "Defining and Reporting Hypoglycemia in Diabetes: A report from the American Diabetes Association Workgroup on Hypoglycemia," Diabetes Care, vol. 28, No. 5, pp. 1245-1249, May 2005.

R. R. Selvaraju et al.: "Grad-CAM: Visual Explanations from Deep Networks via Gradient-Based Localization" 2017 IEEE International Conference on Computer Vision (ICCV) 618-626 (2017).

L. van der Maaten & G. Hinton: "Visualizing Data using t-SNE", J. Mach. Learn. Res. 9, 2579-2605 (2008).

S. H. Ling, P. P. San, H. K. Lam, and H. T. Nguyen, "Hypoglycemia detection: multiple regression based combinational neural logic approach," Soft Comput., vol. 21, No. 2, pp. 543-553, Jan. 2017.

D. K. Rollins et al.: "Free-living inferential modeling of blood glucose level using only noninvasive inputs", J. Process Control 20, 95-107 (2010).

J. L. Marques "Altered ventricular repolarization during hypoglycaemia in patients with diabetes," Diabet. Med. J. Br. Diabet. Assoc., vol. 14, No. 8, pp. 648-654, Aug. 1997.

Laitinen et al. "Electrocardiograms during hyperinsulinemic hypoglycemia in healthy subjects", Ann. Noninvasive Electrocardiol. Off. J. Int. Soc. Holter Noninvasive Electrocardiol. Inc 13, 97-105 (2008).

M. Abadi et al.: "TensorFlow: Large-Scale Machine Learning on Heterogeneous Distributed Systems" (2015).

D. P. Kingma & J. Ba: "A Method for Stochastic Optimization", in Proceedings of the 3rd International Conference on Learning Representations (2015).

V. Nair & G. E. Hinton "Rectified Linear Units Improve Restricted Boltzmann Machines", Proceedings of the 27th International Conference on International Conference on Machine Learning 807-814 (Omnipress, 2010).

\* cited by examiner

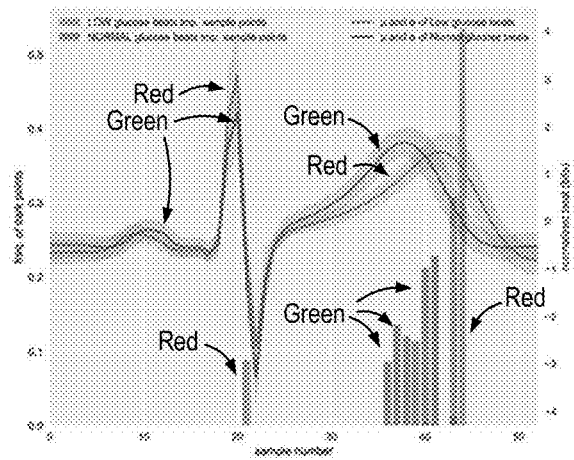
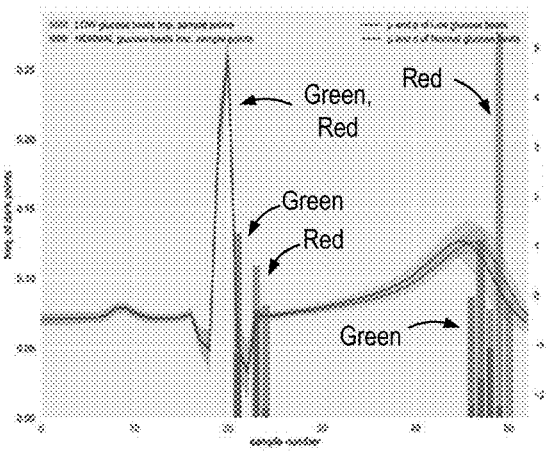
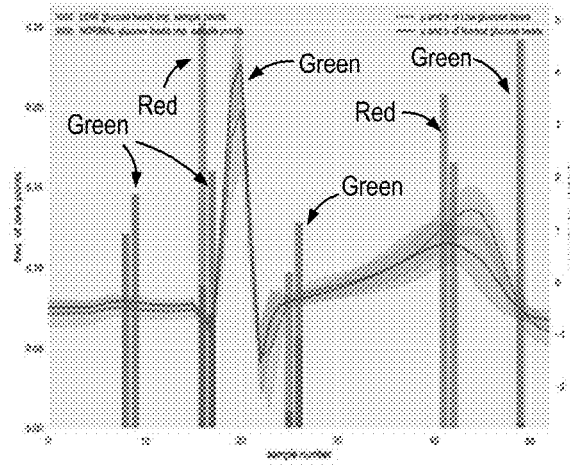
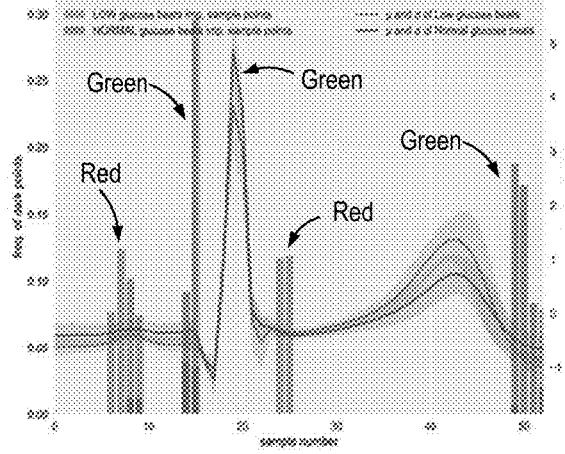
Fig. 4

(a)
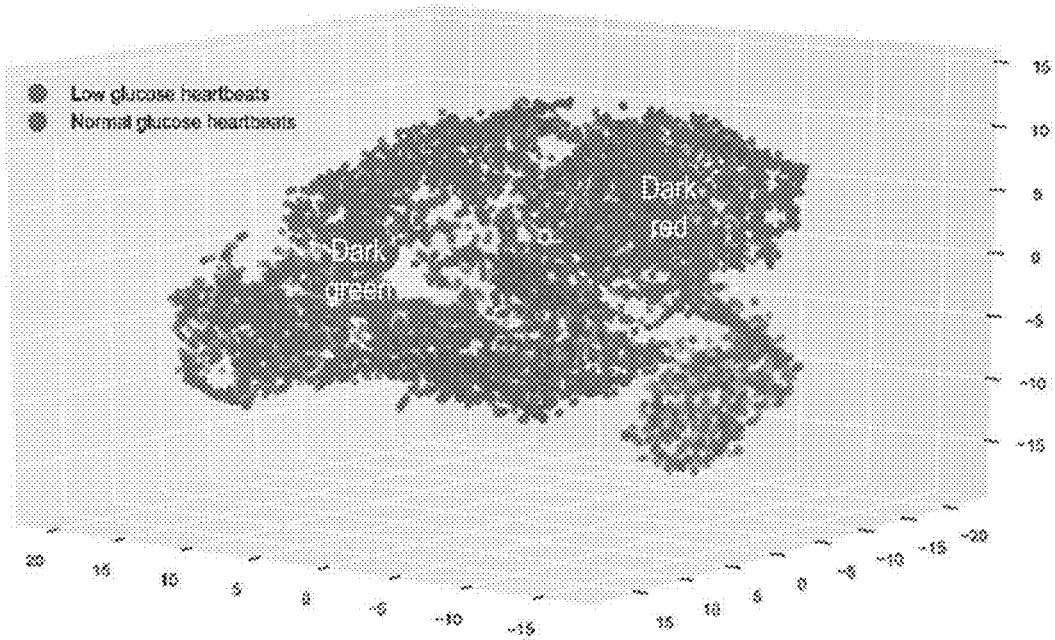
(b)
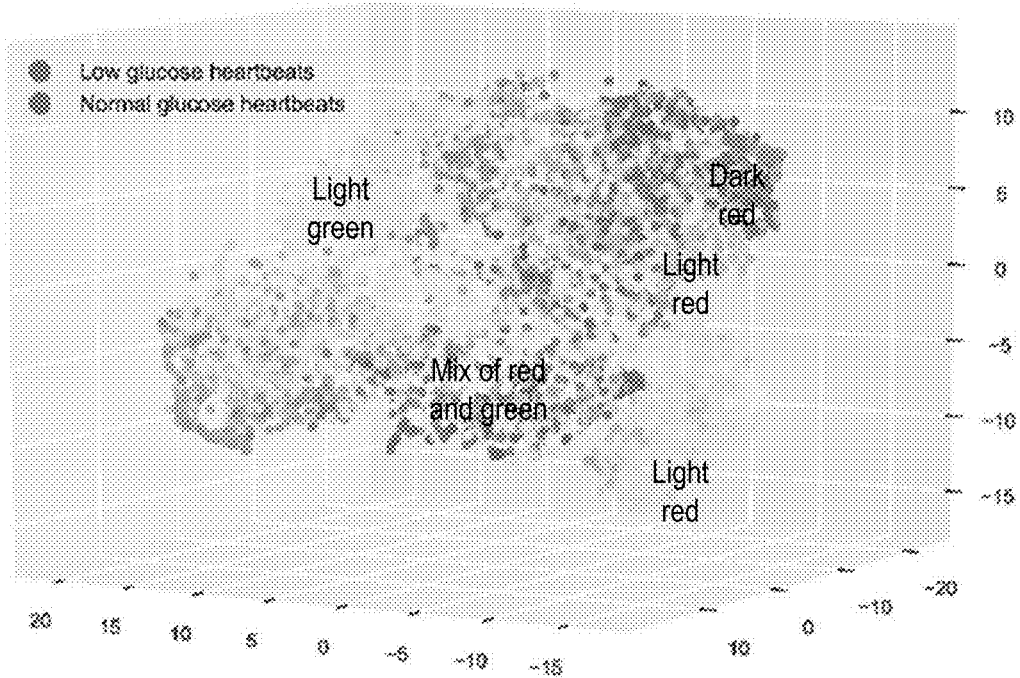
Fig. 5

Participants' demographics

| Participant ID | Age | Gender | Weight (kg) | Height (cm) | BMI |
|---|---|---|---|---|---|
| 1 | 35 | M | 80 | 180 | 24.6 |
| 2 | 29 | F | 55 | 162 | 20.9 |
| 3 | 32 | M | 81 | 184 | 23.9 |
| 4 | 27 | F | 63 | 167 | 21.7 |
| 5 (pre-diabetic) | 40 | M | 64 | 170 | 22.1 |
| 6 (pre-diabetic) | 56 | M | 98 | 168 | 34.7 |
| 7 | 58 | F | 75 | 158 | 30 |
| 8 | 26 | M | 78 | 183 | 23.2 |

Rows 1–4: Eligible participants

| Group | Low glucose condition |||||||||
|---|---|---|---|---|---|---|---|---|---|
| | Q_amp ||| R_amp ||| T_amp |||
| | H | p-value | p-value post hoc | H | p-value | p-value post hoc | H | p-value | p-value post hoc |
| S1 <-> S2 | 8285.5 | <0.01 | <0.01 | 13735.6 | <0.01 | <0.01 | 9054.44 | <0.01 | <0.01 |
| S1 <-> S3 | 5390.59 | <0.01 | <0.01 | 265.044 | <0.01 | <0.01 | 599.2 | <0.01 | <0.01 |
| S1 <-> S4 | 17489.95 | <0.01 | <0.01 | 42.43 | <0.01 | 0.136 | 283.67 | <0.01 | <0.01 |
| S2 <-> S3 | 1922 | <0.01 | <0.01 | 14554.1 | <0.01 | <0.01 | 3659.64 | <0.01 | <0.01 |
| S2 <-> S4 | 1552.74 | <0.01 | <0.01 | 8475.4 | <0.01 | <0.01 | 3338.05 | <0.01 | <0.01 |
| S3 <-> S4 | 10865.08 | <0.01 | <0.01 | 372.38 | <0.01 | <0.01 | 1075.31 | <0.01 | <0.01 |
| | QT ||| RT_amp ||| T_slope |||
| | H | p-value | p-value post hoc | H | p-value | p-value post hoc | H | p-value | p-value post hoc |
| S1 <-> S2 | 13042.9 | <0.01 | <0.01 | 11073.3 | <0.01 | <0.01 | 365.61 | <0.01 | <0.01 |
| S1 <-> S3 | 18328.62 | <0.01 | <0.01 | 2.98 | 0.084 | 0.064 | 7553.51 | <0.01 | <0.01 |
| S1 <-> S4 | 1541.51 | <0.01 | <0.01 | 53.89 | <0.01 | 0.064 | 4799.6 | <0.01 | <0.01 |
| S2 <-> S3 | 4826.29 | <0.01 | <0.01 | 5560.2 | <0.01 | <0.01 | 3885.8 | <0.01 | <0.01 |
| S2 <-> S4 | 11073.53 | <0.01 | <0.01 | 4097.5 | <0.01 | <0.01 | 2501 | <0.01 | <0.01 |
| S3 <-> S4 | 12925.27 | <0.01 | <0.01 | 0.73 | 0.394 | 0.824 | 176.85 | <0.01 | <0.01 |

(b)

| Group | Normal glucose condition |||||||||
|---|---|---|---|---|---|---|---|---|---|
| | Q_amp ||| R_amp ||| T_amp |||
| | H | p-value | p-value post hoc | H | p-value | p-value post hoc | H | p-value | p-value post hoc |
| S1 <-> S2 | 9186.49 | <0.01 | <0.01 | 11126.85 | <0.01 | <0.01 | 4108.15 | <0.01 | <0.01 |
| S1 <-> S3 | 16880.98 | <0.01 | <0.01 | 2872.64 | <0.01 | <0.01 | 7111.15 | <0.01 | <0.01 |
| S1 <-> S4 | 23510.48 | <0.01 | <0.01 | 8962.07 | <0.01 | <0.01 | 3872.39 | <0.01 | <0.01 |
| S2 <-> S3 | 3764.68 | <0.01 | <0.01 | 11016 | <0.01 | <0.01 | 338.98 | <0.01 | <0.01 |
| S2 <-> S4 | 504.26 | <0.01 | <0.01 | 2608.29 | <0.01 | <0.01 | 0.07 | 0.798 | 0.948 |
| S3 <-> S4 | 17293.89 | <0.01 | <0.01 | 2841.9 | <0.01 | <0.01 | 22.37 | <0.01 | <0.01 |
| | QT ||| RT_amp ||| T_slope |||
| | H | p-value | p-value post hoc | H | p-value | p-value post hoc | H | p-value | p-value post hoc |
| S1 <-> S2 | 10322.81 | <0.01 | <0.01 | 6780.41 | <0.01 | <0.01 | 1644.39 | <0.01 | <0.01 |
| S1 <-> S3 | 18477.87 | <0.01 | <0.01 | 5880.23 | <0.01 | <0.01 | 985.03 | <0.01 | <0.01 |
| S1 <-> S4 | 23969.46 | <0.01 | <0.01 | 7816.6 | <0.01 | <0.01 | 1520.74 | <0.01 | <0.01 |
| S2 <-> S3 | 641.89 | <0.01 | <0.01 | 370 | <0.01 | <0.01 | 180.86 | <0.01 | <0.01 |
| S2 <-> S4 | 461.3 | <0.01 | <0.01 | 87.68 | <0.01 | <0.01 | 0.94 | 0.332 | <0.01 |
| S3 <-> S4 | 58.07 | <0.01 | <0.01 | 379.15 | <0.01 | <0.01 | 175 | <0.01 | <0.01 |

Fig. 13

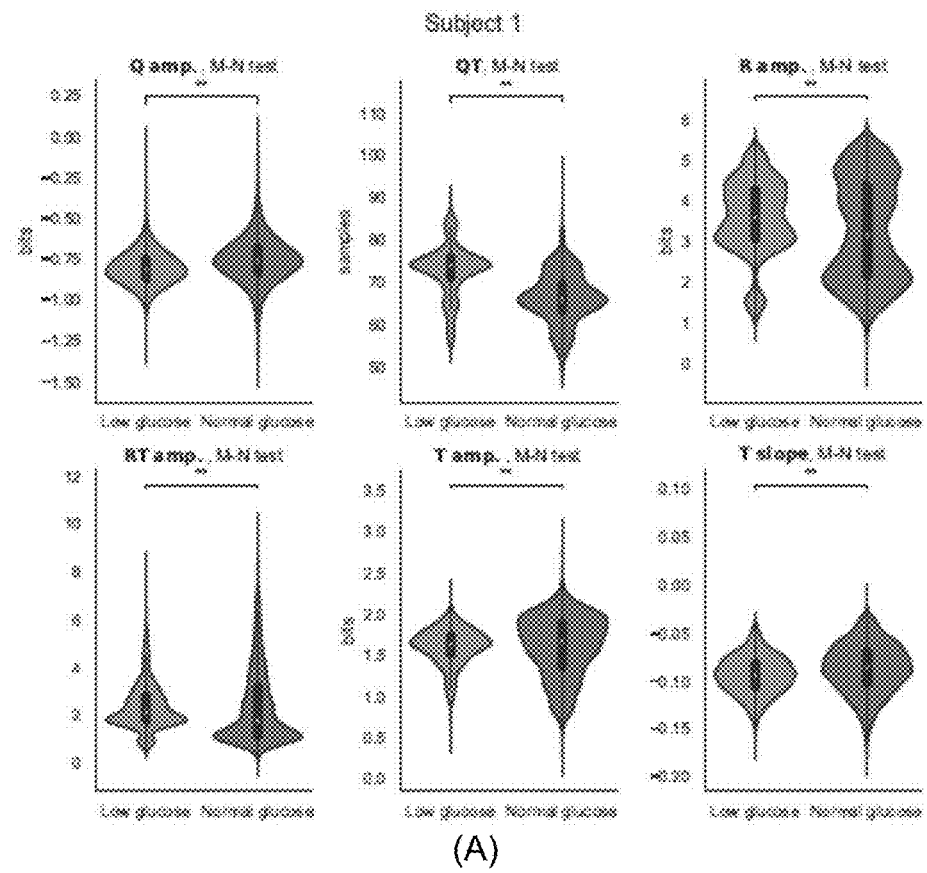
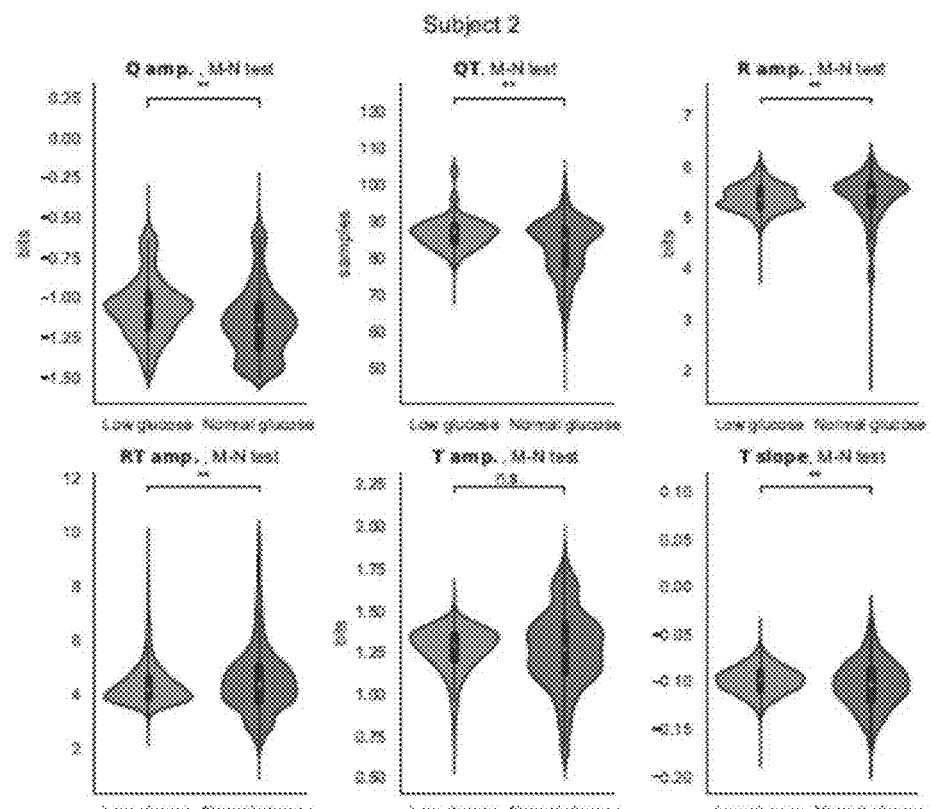
Fig. 16

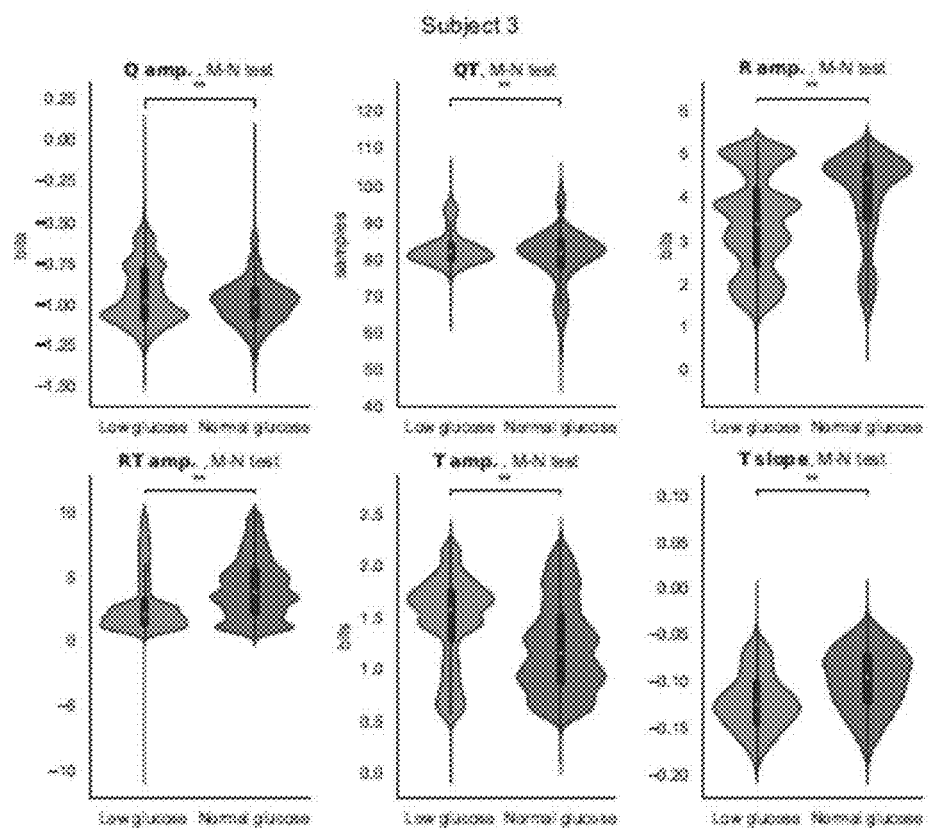
(C)
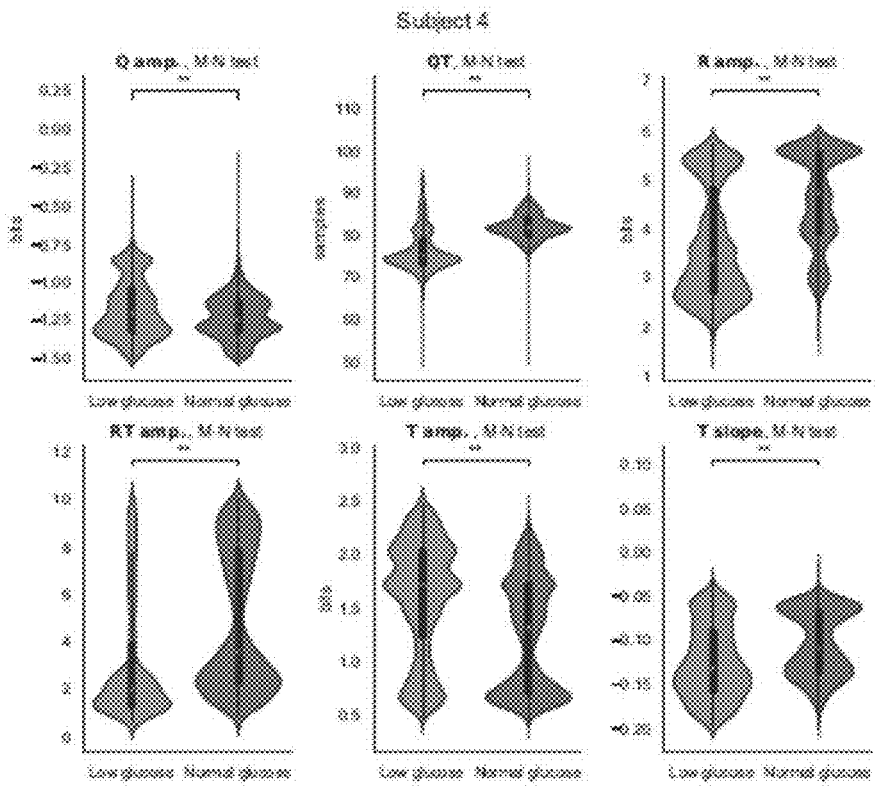
(D)
Fig. 16

ELECTROCARDIOGRAM-BASED BLOOD GLUCOSE LEVEL MONITORING

FIELD

The present invention relates to electrocardiogram-based blood glucose level monitoring.

BACKGROUND

Tracking fluctuations in blood glucose levels is important for monitoring the health of both healthy individuals and diabetic patients. High glucose levels (hyperglycemia) so result in long-term complications and can damage the kidneys, nerves, blood vessels in the eye and can bring many other complications. Low blood glucose levels (hypoglycemia) may result in acute short-term alterations of health status such as confusion, irritability, palpitations, feeling tremulous and sweaty and can even result in severe loss of attention, coma or death. In fact, hypoglycemia can be particularly dangerous during some activities requiring high attention, such as driving and surgery. Thus, technologies for non-invasive, continuous monitoring of glucose concentration aimed at early-detecting hypoglycemic events are highly desirable.

Most diffuse methods for blood glucose testing are performed by analysing a drop of blood resulting from a finger prick. However, this method is not-continuous, invasive, cumbersome, expensive and it has been demonstrated that it affects patient compliance with the glucose measurements. As an alternative, continuous glucose monitoring devices (CGMs) were developed, they can infer the blood glucose levels in real-time based on the glucose in the interstitial fluid. These devices significantly empowered diabetic patients but still they present some limitations that make them unattractive for pre-diabetic patients and diabetic persons. Specifically, all commercially available CGMs can only be worn for a limited number of days, usually between 7 and 14 days, most of the CGMs require finger prick calibration some studies report that the reliability of CGMs is limited during low blood glucose level events and they sample from the interstitial fluid which still requires a cannula to be inserted in the subcutaneous tissue, which still make them invasive, although minimally so. Moreover, CGMs are quite expensive, which may limit their use for continuous daily glucose monitoring especially pre-diabetic patients. However, despite these potential limitations, recent research revealed that CGM systems can overcome the limitations of the self-monitoring of blood glucose (SMBG) using glucometers by providing a complete glucose profile and a detailed history of the nocturnal glucose levels, therefore CGMs clearly showed an improved glucose control in diabetic patients. Currently, there is no universally accepted protocol for assessing the accuracy of the CGMs, similar to the ISO 15197:2013 standard for reliability of the SMBGs. In this context a number of metrics have been used to characterize the accuracy of the CGMs and one in particular has emerged as being the predilect measure for the sensor accuracy, the mean absolute relative difference (MARD). Different studies reported MARD values of 9.5% to 19% MARD for different CGM sensors, however, these values are close to the reported MARD for the point-of-care glucometers (5.6% and 20.8%), therefore, CGM devices are intended to replace blood glucose testing for diabetes treatment decisions.

A number of non-invasive (for example, without skin penetration) technologies have been proposed, usually, they are referred to as non-invasive continuous glucose monitors (NI-CGMs). These devices employ techniques such as Raman spectroscopy, fluorescence technology, optical coherence tomography and optical polarimetry, and seek to exploit changes in the chemical and physical tissues properties determined by the glucose variations. Recent reviews of these devices show that they are promising, although the underlying technology can still be improved and so make them more accurate, easier to wear, operate, maintain and calibrate.

Finally, the majority of CGMs technologies are not yet designed to combine glucose measurements with other physiological signals or activity measures, which may reflect the subject physical and emotional conditions.

The increased number of wearable non-invasive sensors developed for tracking activity or cardiac signal, such as an electrocardiogram (ECG), are creating new and unexplored opportunities for early detection of hypoglycemic events. New strategies have been proposed to overcome the limitations of currently-available, traditional CGM devices such as combining direct glucose data with physiological parameters to improve the accuracy of the readings (that is, enhanced-direct CGM); combination physiological parameters, vital signs, food intake for the estimation or prediction of either glucose levels or hypoglycemia/hyperglycemia events (that is, indirect CGMs); use of just the ECG data to detect or predict hypoglycemia (that is, minimally-invasive indirect CGM).

This last approach seems promising as ECG can be recorded, transmitted and processed quite easily and ECG sensors can be embodied in every-day-use objects, such as, a car steering wheel, a backrest of an office chair, or smartwatches. Moreover, ECG-based glucose detection can be more cost-effective and attractive for pre-diabetic individuals or patients suffering from other comorbidities, who may be familiar with ECG monitoring applications both for clinical and consumer (for example, sport, fitness) applications.

Associations between ECG parameters (such as the QT interval duration) and glucose levels have been investigated in both healthy and diabetic subjects in the past few years. It is known that blood glucose concertation can affect the electrical activity of the heart, although the mechanisms behind these changes are not yet completely understood. Two reported mechanisms are hypokalemia and the disruption of the neural regulation system. Hypokalemia increases potassium conductivity in the myocardial tissue resulting in shorten action potentials. This is known to affect the ECG causing ST depression, biphasic T-wave (first positive, then negative) followed by a positive U-wave. Both hypokalemia and neural regulation are fast, and thus changes in the ECG should be coincident with the occurrence of the low blood glucose levels. A third possible cause is that low blood glucose levels affect the hormonal secretion, which will determine a delay in the cardiac changes with respect with the onset of hypoglycaemia.

A variety of methods have been proposed to detect low-glucose levels using different combinations of ECG features, including principal component analysis (PCA), genetic algorithms, particle swarm optimization, neural networks. Typically, these methods use the QT interval, RT-amplitude ratio and heart rate (HR) as ECG features. HR, QT interval, change of HR and change of QT were used as inputs in a system for hypoglycemia detection in type 1 diabetic children based on extreme learning machine (ELM) methodology.

ECG feature extraction, however, suffers from high sensitivity to ECG anomalies such as significant changes in the T-wave morphology (for example, flat or inverted) since reliable measurement of QT is not straightforward. Moreover, the majority of the studies investigating ECG-blood glucose associations have been carried out in a controlled clinical setting and not in real-life conditions. Several studies which investigated the hypoglycemia effects on ECG involves recruiting healthy participants and inducing low-glucose levels using the clamping technique to bring the blood glucose concentration to values between 3 mmol/L and 3.5 mmol/L. Also, these studies reported suffering significant limitations, namely the difficulty of handling ECG anomalies (mainly changes in the T-wave morphology) and the small number of participants compounded by large differences in individual ECGs. In addition, all these approaches required heavy reliance on data pre-processing and feature extraction, selection and prioritization.

SUMMARY

According to a first aspect of the present invention there is provided a computer system configured, in response to receiving electrocardiogram data measured over a given period of time for a given subject, to classify the electrocardiogram data using at least one neural network and a personalised model which is specific to the given subject so as to identify whether there is a low blood glucose level condition and, upon identifying the low blood glucose level condition, to flag an alarm condition.

This can help to increase accuracy of detecting low blood glucose level.

The electrocardiogram data preferably comprises an electrocardiogram signal corresponding to a sequence of heartbeats. In other words, feature extraction is not used.

The subject may suffer type I or type II diabetes or suspected to suffer from type I or type II diabetes. The subject may be pre-diabetic or suspected to be pre-diabetic.

The subject may be a driver or operator of a vehicle, such as motor car. The subject may be the operator of plant or machinery. The subject may be engaged in a skilled task, for example, a surgeon engaged in an operation. The subject may be a professional or a recreational athlete. The subject mat be a recreational athlete.

The alarm signal may be sent to a carer, parent or guardian. The alarm signal may be sent to a medical practitioner, such as a doctor, nurse or paramedic. The alarm signal may be sent to a medical institution, such as a hospital, surgery or ambulance station.

The electrocardiogram data may comprise an electrocardiogram signal corresponding to a sequence of heartbeats.

The at least one neural network may include a convolutional neural network. The at least one neural network may include a recurrent neural network.

The computer system may be arranged to receive the electrocardiogram data from a remote location and, in response to the alarm condition, to transmit an alarm signal to the remote location or another remote location.

The computer system may be arranged to receive the electrocardiogram data locally and, in response to the alarm condition, to generate an alarm or to transmit an alarm signal a remote location. The remote location could be doctor, hospital, clinic, carer, health professional The computer system may receive other data and which is configured to classify the electrocardiogram data and other data. The other data may include one or more of activity data, time series data, body temperature, and skin conductance. The period may be greater than or equal to 1 minute and less than or equal to 15 minutes. The period may be greater than or equal to 5 minutes.

The computer system may be portable. For example, the portable computer system may be a laptop computer, a tablet computer, or a hand-held device, such as a mobile communications device (for instance, a smart phone).

The computer system may be a server computer.

According to a second aspect of the present invention there is provided blood glucose level monitoring system comprising the computer system of the first aspect of the invention, an electrocardiogram monitoring device and an agent device configured to receive electrocardiogram data from the electrocardiogram monitoring device and to transmit the electrocardiogram data to the computer system.

The computer system and the agent device may be integrated into one device. The electrocardiogram monitoring device may be a non-invasive, wearable device. The non-invasive, wearable device may be non-intrusive. The agent device may comprise a mobile communications device.

According to a third aspect of the present invention there is provided an agent device for use in electrocardiogram-based blood glucose level monitoring comprising a first network interface for receiving electrocardiogram data, a buffer for storing electrocardiogram data received via the first interface, a second network interface for transmitting the electrocardiogram data and a controller configured to cause transmission of the electrocardiogram data stored in the buffer in response to a transmission-triggering condition.

The agent device may be capable of receiving data and may further comprise a user interface, wherein the controller is configured, in response to receiving an alarm condition indicative of a low blood glucose level, to activate an alarm via the user interface.

According to a fourth aspect of the present invention there is provided apparatus for capturing and forwarding electrocardiogram data, the apparatus comprising an electrocardiogram monitoring device; and the agent device of the third aspect of the invention in communication with the electrocardiogram monitoring device According to a fifth aspect of the present invention there is provided a computer-implemented method of generating a model, the method comprising receiving electrocardiogram data and blood glucose data measured over at least one period including at least one night for a given subject, determining from the blood glucose data whether at least two low blood glucose level events have occurred during the period, extracting individual heartbeats from the electrocardiogram data, providing the electrocardiogram data for individual heartbeats and blood glucose data to at least one neural network, generating a model for the given subject and storing the model.

Preferably the electrocardiogram data and blood glucose data is measured over at least two periods including at least two nights for a given subject.

The at least two events preferably last at least 20 minutes. The at least one period preferably include at least two nights.

The computer-implemented method may further comprise filtering glucose events having a duration shorter than a pre-defined duration. The pre-defined duration is preferably 10 minutes and more preferably 5 minutes.

According to a sixth aspect of the present invention there is provided a computer program product comprising a computer-readable medium (which may be non-transitory) storing the model generated by the method of the fifth aspect. The model is a personalised model which is specific to a given subject so as to identify whether a low blood glucose level condition is present in electrocardiogram data measured over a given period of time for the given subject.

According to a seventh aspect of the present invention there is provided a computer-implemented method comprising receiving electrocardiogram data measured over a given period of time for a given subject, classifying the electrocardiogram data using at least one neural network and a personalised model which is specific to the given subject so as to identify whether a low blood glucose level condition is present; and upon identifying the presence of the low blood glucose level condition, flagging an alarm condition.

According to an eighth aspect of the present invention there is provided a computer program comprising instructions for performing the method of the fifth aspect or sixth aspect of the present invention.

According to a ninth aspect of the present invention there is provided a computer program product comprising a computer-readable medium (which may be non-transitory) and a computer program of the eighth aspect of the present invention stored on the computer-readable medium.

BRIEF DESCRIPTION OF THE DRAWINGS

Certain embodiments of the present invention will now be described, by way of example, with reference to the accompanying drawings, in which:

FIGS. 4a to 4d are plots of relevant heartbeat segments for hypoglycemia detection using Grad-CAM method for four different subjects;

FIG. 5a is an activation space plot of test heartbeats for subject 3 colour-coded according to glucose annotation (class);

FIG. 5b is an activation space plot of test heartbeats for subject 3 colour-coded according to glucose value, the darker the colour the higher the glucose value for normal beats and the lower for low glucose beats

FIG. 11 is a table of participant's demographics;

FIG. 13 is a table showing Kruskal-Wallis H-test between pairs of subjects for the extracted ECG features corresponding to Low glucose (a) and Normal glucose (b); p-value post hoc column presents the post hoc pairwise test results for multiple comparisons of mean rank sums using Dunn's test;

FIGS. 16A to 16D are plots showing Mann-Whitney rank test on the extracted ECG parameters for each subject; all the statistical tests showed significant differences between the groups (low vs normal glucose level).

DETAILED DESCRIPTION

Figure 1:
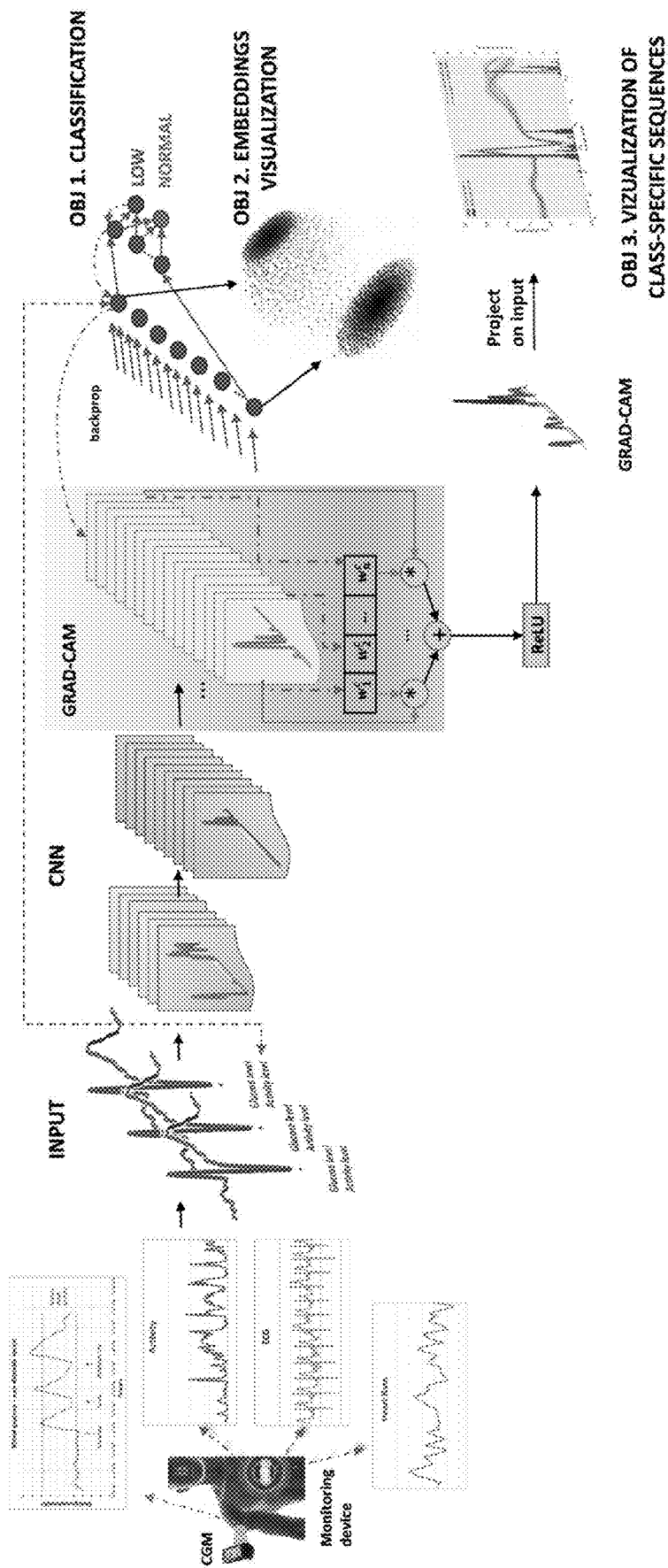
FIG. 1 schematically illustrates a convolutional neural network (CNN)-based system for detecting low glucose levels using an ECG signal and methods of using the system.

The following disclosure describes methods and results relating to a personalized deep learning system for automatic nocturnal low glucose level detection in healthy individuals, based only on electrocardiogram (ECG) acquired with wearable devices in every-day living conditions. The shape of the individual heartbeats is investigated as to whether it is informative for detecting low glucose events and whether taking into account information about the sequence of the heartbeats in a specific timeframe can improve the system's performance. A method is presented which can help clinicians visualise the ECG changes that are the most informative for detecting low glucose levels, combining nonlinear dimension reduction and a localization method for the class-specific subsequences in the input time series.

Preferably, the threshold level (or "value") below which blood glucose level is considered to be low is specific to a particular subject. For example, for a diabetic subject, the value may be 70 mg/dL, whereas for a healthy subject a lower value may be used.

A concentration of glucose in blood of 70 mg/dL is equivalent to 3.88 mmol/L. Reference is made to A. D. Association, "Defining and Reporting Hypoglycemia in Diabetes: A report from the American Diabetes Association Workgroup on Hypoglycemia," Diabetes Care, vol. 28, no. 5, pp. 1245-1249, May 2005.

Results

Classification of the ECG Signal that Correspond to Normal/Low Glucose Values

A study was carried out with the aim of detecting low glucose levels in healthy individuals based on the ECG signals and actigraphy, recorded continuously during an average period of eight nights for each subject. ECG, actigraphy and CGM were recorded using wearable sensors in the form of Medtronic Zephyr BioPatch™ HP5. A total number of eight healthy participants were recruited, of which only four were eligible to be included in the study. In fact, four participants did not experience any hypoglycemic events during the recording period, which was not surprising as participants were healthy subjects.

As hereinafter described, a CNN network was trained on the isolated heartbeats extracted from the raw ECG signal. The system is a person-specific one in which data recorded for a participant during the first four or five days was used for training the model, which was tested using data from the same subject acquired in the remaining days. However, there were a few exceptions when the occurrence of low glucose events so was not balanced during the recording period, so the days considered for training and testing were not consecutive. In this study, it is assumed that the cardiac changes occurred in the same time as low blood glucose levels, and there was no account for other lag except for the 5-minute delay in glucose levels readings introduced by the CGM. Actigraphy was measured using sensors embodied in the body-worn ECG device.

Activity levels were estimated from the 3-axis accelerations and computed as:

$$VMU = \sqrt{x^2 + y^2 + z^2} \quad (1)$$

where x, y and z are the averages of the three-axial acceleration over the previous one second. Thus, the detection algorithm was mathematically formulated as following:

$$GlucoseLevel = f(ECG\_beat, Activity\_level, Timestamp) \quad (2)$$

where the $f$ function is given by the CNN/RNN, the ECG beat is the heartbeat time series and the timestamp is the date and time of the annotated R peak.

The low glucose detection problem was cast to a classification problem in which the inputs represent the extracted heartbeats together with an additional covariate—the activity level and output—normal/low glucose level.

Figure 2:
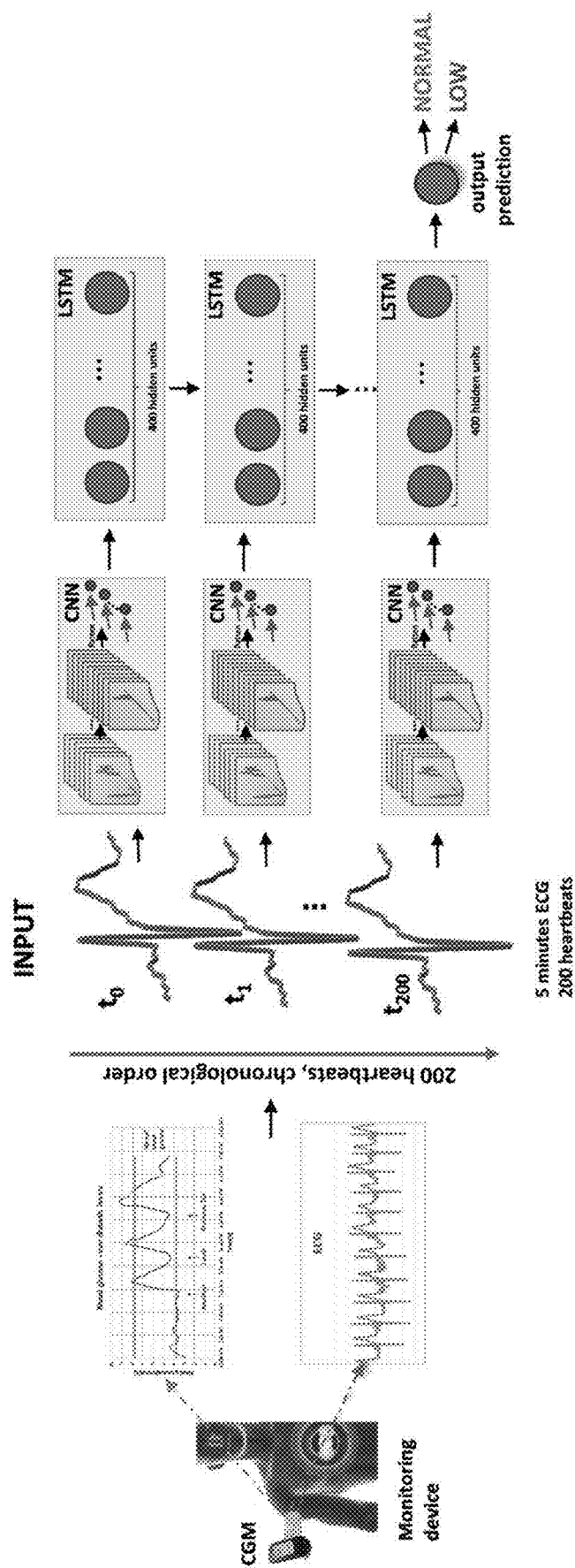
FIG. 2 schematically illustrates a combined CNN and recurrent neural network (RNN) system for detecting low blood glucose in a 5-minute time window of time.

Referring to FIGS. 1 and 2, to test the feasibility of heartbeat classification by glucose levels, two different approaches are proposed: a CNN based system and a CNN+RNN system. The models are described in more detail hereinafter.

FIG. 1 schematically shows a CNN based system illustrating the study objectives. To detect the low glucose levels using the ECG signal, three objectives were set. A first objective (OBJ 1) was to build a classifier (using a CNN network) for the low glucose levels detection task. Secondly, the chosen method for performing the classification (i.e., CNN) enables to further investigate the learned representation of the input heartbeats (OBJ 2), representation (embedding) that can be used in for data visualization/clustering in lower dimensional space. The method used for the nonlinear dimension reduction is t-SNE. The third objective (OBJ 3) was to investigate the important regions in the input time series (the heartbeat signal) that contribute the most to the final classification result (Grad-CAM method).

FIG. 2 schematically shows a CNN+RNN system for low blood glucose detection in a 5-minute window of time. The individual heartbeats were firstly isolated, then grouped into 5-minutes segments. Each considered 5-minutes segment was chosen if it contained at least 200 heartbeats. This condition also implies that the glucose event (low/normal) should last for at least 5 minutes. Thus each 5-minute ECG segment was associated with a single label: low/normal glucose. Each heartbeat was firstly transformed into a feature representation using a CNN network, representation that was fed as input to the sequence model (RNN cells). The outputs of the final RNN are the inputs to a linear layer with a softmax producing a distribution P over the two possible outputs: normal or low glucose values.

The reason behind the CNN choice lies in their capability of learning hierarchical, abstract representations of the input space that are relevant to performing specific tasks. The CNN+RNN model was built considering RNN's capability of learning sequences, in this case, sequences of consecutive heartbeats, which were supposed important for detecting low glucose events. In this combined model, the CNN module was used for learning the heartbeat representation, while the RNN component was responsible for learning the heartbeats sequence in the considered 5-minute ECG intervals. In order to obtain personalized models, the two models (CNN, CNN+RNN) were trained from scratch for each participant using a variable number of recording nights out of which at least two nights should contain low blood glucose events. The number of final heartbeats included in the training/validation and testing is described hereinafter.

CNN Based System

Referring in particular to FIG. 1, for the CNN based system, two evaluation strategies were considered namely, one in which all the individual heartbeats corresponding to the test days were classified and a second strategy used was to employ a majority-voting scheme for the heartbeats in a 10-minute window of time. Results are reported in Table Ia and Ib below for all the eligible participants on the testing and training datasets.

TABLE Ia

| Subject ID | Sensitivity % | | Specificity % | | Accuracy % | | Number of correctly predicted 10 minutes intervals/total |
|---|---|---|---|---|---|---|---|
| | Individual beat | 10 min voting | Individual beat | 10 min voting | Individual beat | 10 min voting | |
| Subject 1 | 74.2 | 78.0 | 71.2 | 77.1 | 72.3 | 77.4 | 106/141 = 75.2% |
| Subject 2 | 66.0 | 79.8 | 69.5 | 77.1 | 69.3 | 77.3 | 146/187 = 78.1% |
| Subject 3 | 82.2 | 100 | 87.4 | 91.9 | 87.1 | 92.4 | 168/183 = 91.8% |
| Subject 4 | 81.1 | 91.5 | 76.3 | 80.5 | 77.2 | 82.6 | 128/156 = 82.1% |
| Average | 75.9 ± 7.4 | 87.5 ± 10.3 | 76.1 ± 8.0 | 81.7 ± 7.0 | 76.5 ± 7.7 | 82.4 ± 7.0 | 81.8% |

TABLE Ib

| Subject ID | Sensitivity % | | Specificity % | | Accuracy % | | Number of correctly predicted 10 minutes intervals/total |
|---|---|---|---|---|---|---|---|
| | Individual beat | 10 min voting | Individual beat | 10 min voting | Individual beat | 10 min voting | |
| Subject 1 | 91.3 | 94.6 | 79.7 | 80.4 | 84.8 | 86.5 | 118/136 = 86.8% |
| Subject 2 | 93.1 | 100 | 87.5 | 93.2 | 88.5 | 94.5 | 174/184 = 94.6% |
| Subject 3 | 97.5 | 100 | 88.4 | 89.7 | 89.9 | 91.5 | 247/270 = 91.5% |
| Subject 4 | 75.0 | 83.5 | 81.3 | 85.5 | 78.3 | 84.6 | 138/163 = 84.7% |
| Average | 89.2 ± 9.8 | 94.5 ± 7.7 | 84.2 ± 4.3 | 87.2 ± 5.5 | 85.4 ± 5.1 | 89.3 ± 4.5 | 89.4% |

Figure 3:
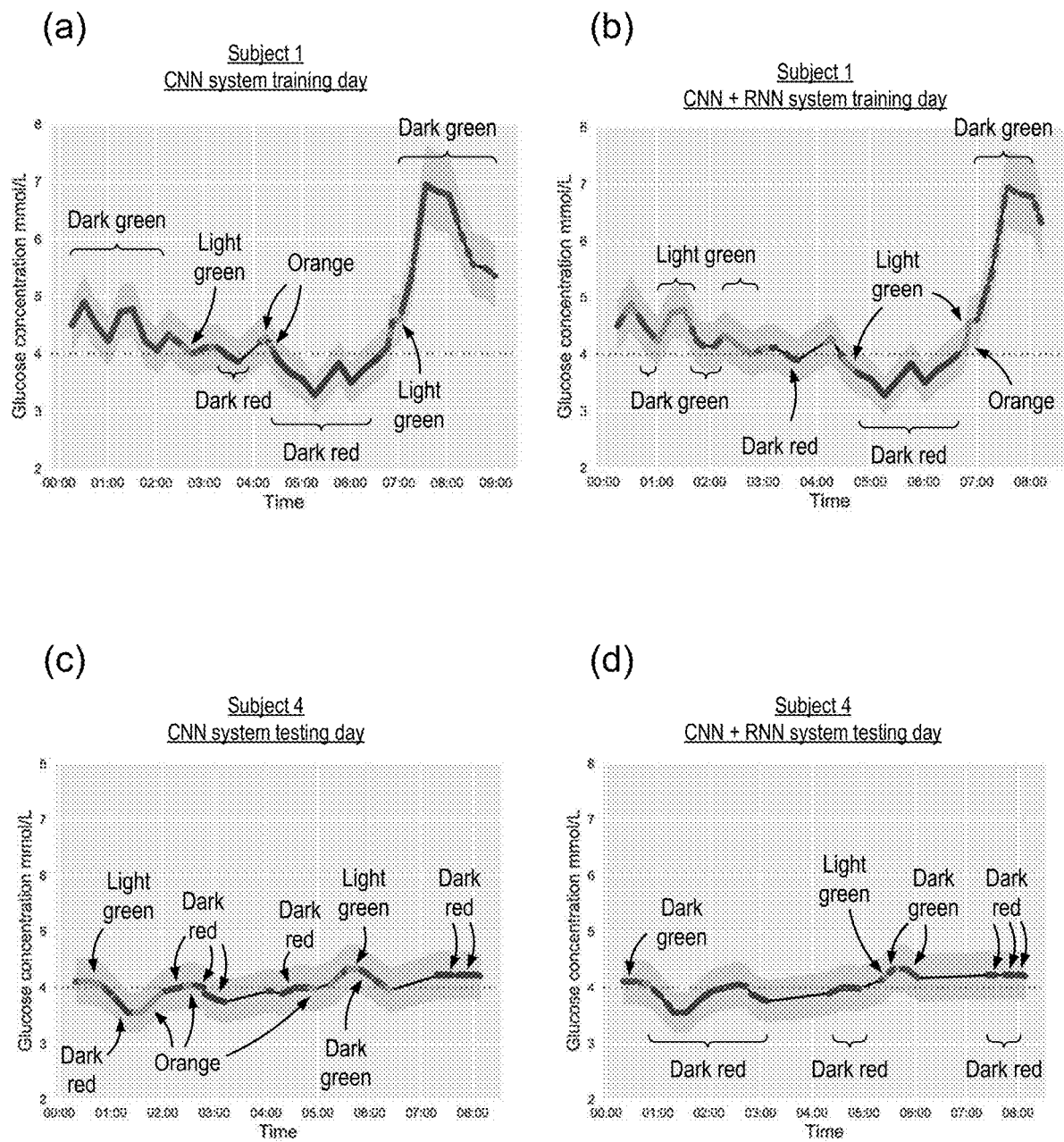
FIGS. 3a to 3d are plots of glucose concentration and predicted class for two subjects and two different neural networks.

FIGS. 3a to 3d are plots illustrating hypoglycemia detection during the night using the so heartbeat majority voting in a 10-minute window of time. The black waveform represents the glucose values recorded by the CGM, considered as ground truth glucose level in this study. The grey shaded regions illustrate a ±10% error boundary for the CGM glucose readings. The colour of the points indicates the predicted class: red for the predicted low-glucose levels and green for the predicted normal-glucose levels. Moreover, dark colours indicate more certain predictions: dark red points accounted for low-glucose predictions with the predicted probability >0.7, while light red accounted for low-glucose prediction with predicted probability ≤0.7; dark green accounted for normal-glucose prediction with predicted probability >0.7 and light green accounted for normal-glucose prediction with a probability ≤0.7. FIGS. 3a and 3b present the glucose levels predictions for a sample training day, while FIGS. 3c and 3d present the glucose predictions for a sample test day exceeded the number of low glucose heartbeats (10 times more), which was the case for participants 2 and 3, the proposed system was still providing good result, suggesting that DL was resilient to the unbalanced dataset.

CNN+RNN Based System

Referring to FIG. 2, the CNN+RNN system was evaluated on 5-minutes input ECG excerpts. The first extracted 200 heartbeats in the 5 minutes ECG were considered as input sequences for the CNN, the output representation of the CNN was fed into a stack of RNN cells, which produced the final prediction, as shown in FIG. 2. To evaluate the model, a majority voting was performed for 10 minutes ECG segments, similar to the voting employed for the CNN-based model. The voting strategy ensured that the prediction frequency was similar to the resolution of the CGMs which is usually between 5 and 15 minutes and it corrected the annotation of certain isolated ECG heartbeats. Results are reported in Tables IIa and IIb for the test and training days respectively.

TABLE IIa

| Subject ID | Sensitivity % | | Specificity % | | Accuracy % | | Number of correctly predicted 10 minutes intervals/total |
|---|---|---|---|---|---|---|---|
| | 5-min ECG | 10-min voting | 5-min ECG | 10 min voting | 5-min ECG | 10 min voting | |
| Subject 1 | 79.7 | 80.5 | 69.4 | 73.3 | 73.3 | 76 | 61/82 = 74.4% |
| Subject 2 | 81.8 | 81.8 | 82.2 | 88.0 | 82.2 | 87.5 | 154/178 = 86.5% |
| Subject 3 | 82.4 | 76.5 | 89.6 | 94.6 | 89.2 | 93.7 | 166/179 = 92.7% |
| Subject 4 | 100 | 100 | 81.1 | 82.0 | 84.8 | 85.6 | 128/153 = 83.6% |
| Average | 86.0 ± 9.4 | 84.7 ± 10.4 | 80.6 ± 8.3 | 84.5 ± 9.0 | 82.4 ± 6.7 | 85.7 ± 7.3 | 84.3% |

TABLE IIb

| Subject ID | Sensitivity % | | Specificity % | | Accuracy % | | Number of correctly predicted 10 minutes intervals/total |
|---|---|---|---|---|---|---|---|
| | 5-min ECG | 10 min voting | 5-min ECG | 10 min voting | 5-min ECG | 10 min voting | |
| Subject 1 | 74.8 | 75.2 | 84.6 | 88.6 | 80.0 | 82.3 | 78/95 = 82.1% |
| Subject 2 | 85.9 | 84.1 | 92.8 | 96.3 | 91.4 | 94.1 | 170/180 = 94.4% |
| Subject 3 | 100 | 100 | 84.6 | 89.2 | 87.2 | 91.1 | 240/267 = 89.9% |
| Subject 4 | 92.6 | 90.2 | 91.9 | 94.6 | 92.2 | 92.6 | 145/158 = 91.8% |
| Average | 88.3 ± 10.6 | 87.4 ± 10.4 | 88.5 ± 4.4 | 92.2 13.8 | 87.7 ± 5.5 | 90.0 ± 5.2 | 89.6% |

FIGS. 3a and 3c present the same results for training and testing respectively, but visualized as predicted events over the night, in direct comparison to the baseline CGM glucose values. This visualization provides insightful information about the predicted glucose events otherwise disregarded, including what time certain events occurred, what time the misclassified events occurred, the connection between misclassified events and the considered low glucose threshold, the lag between CGM glucose readings and predictions etc. Moreover, FIGS. 3a to 3d reveal the certainty of the model's predictions, indicated by different colour intensities (dark green/red for most certain prediction), CGM readings uncertainty (grey shadow around the continuous so line) and proximity to the glucose level threshold. As expected, the majority of misclassification events and the less-certain classifications (light green/orange) occurred when the glucose levels were close to the threshold with the grey shadow crossing it. The results presented in Table I revealed that even when the number of normal glucose heartbeats greatly FIGS. 3b and 3d present the classification results, showing the CNN+RNN model predictions over the analysed timeframe for a sample night for two of the subjects Localization of Discriminative Subsequences in the Input Time Series Using Grad-CAM Grad-CAM allows visualization of class-discriminative sequences in the input heartbeat, without requiring modifications to the CNN architecture or retraining. Reference is made to R. R. Selvaraju et al.: "Grad-CAM: Visual Explanations from Deep Networks via Gradient-Based Localization" 2017 IEEE International Conference on Computer Vision (ICCV) 618-626 (2017).

FIGS. 4a to 4d illustrate identification of the most relevant heartbeat segments for hypoglycemia detection using the Grad-CAM method. The solid lines represent the mean of all the heartbeats that correspond to each subject in the training dataset along the recordings: green during normal glucose levels, red during hypoglycemic events. The comparison among four different subjects highlighted the fact that each subject may have a different ECG waveform during hypoglycemic events for instance Subjects 1 and 2 present a visibly longer QT interval during hypoglycemic events, differently from subjects 3 and 4. The error bands represent the standard deviation of the considered heartbeats. The vertical bars represent the histograms of the sample points that were >0.9 in the normalized heatmaps obtained from applying Grad-CAM methods on all the training heartbeats.

Referring to FIGS. 4a to 4d, histograms of the important sample points in the input heartbeats when Grad-CAM was employed are shown. The highlighted subsequences in the input heartbeats were essential information transmitted through the network, enabling the inspection of the class-discriminative information in the input time-series. 3o Therefore, FIGS. 4a to 4d illustrate the subsequences in the input heartbeats that were the most important for the CNN in the classification. As expected, the onset and the offset of the T wave was mainly highlighted as important in all subjects. P wave was indicated as important especially when the amplitude of the P wave was lower for the low glucose beats than for the normal glucose beats, in subjects 3 and 4. Moreover, the QRS onset and offset were marked as important in subjects 2-4.

Dimensionality Reduction—CNN Based System

A non-linear dimension reduction method was used to visualize the data using the learned embeddings (that is, the last CNN layer activations) in lower dimensional space. Specifically, t-distributed stochastic neighbour embedding (t-SNE) method was so employed for dimensionality reduction. Reference is made to L. van der Maaten & G. Hinton: "Visualizing Data using t-SNE", J. Mach. Learn. Res. 9, 2579-2605 (2008). t-SNE was applied to a balanced subset of the heartbeats included in the test dataset (the normal glucose heartbeats were randomly down sampled without replacement to match the number of the low glucose heartbeats).

FIGS. 5a and 5b show t-SNE visualization of the test heartbeats corresponding to subject 3 in activation space representation. The red heartbeats correspond to a low glucose level (<4.0 mmol/L) and the green heartbeats that correspond to normal glucose levels. FIG. 5a is a t-SNE visualization when the heartbeats are colored according to the glucose annotation (class) FIG. 5b is a t-SNE visualization using a color map that shows the glucose value associated with each heartbeat, the darker the color the higher the glucose value for normal beats and the lower for low glucose beats.

FIGS. 5a and 5b present the t-SNE visualization of the test heartbeats corresponding to one of the subjects (subject 3) applied to the activation space of the CNN's last layer. In this space, as shown in FIGS. 5a and 5b, it can be observed that the heartbeats are organized in 2 clear clusters that correspond to the low and normal glucose levels. Moreover, FIG. 5b shows that heartbeats corresponding to lower (i.e., dark red) or higher (dark green) glucose values are clustered in smaller regions. This could be interpreted as an inner validation of the method proposed and a demonstration of the discrimination power of the network's learned features, which evidently allowed the unsupervised separation of the heartbeats in two different groups that are also in agreement with the corresponding glucose value magnitude.

Statistical Analysis

Figure 14:
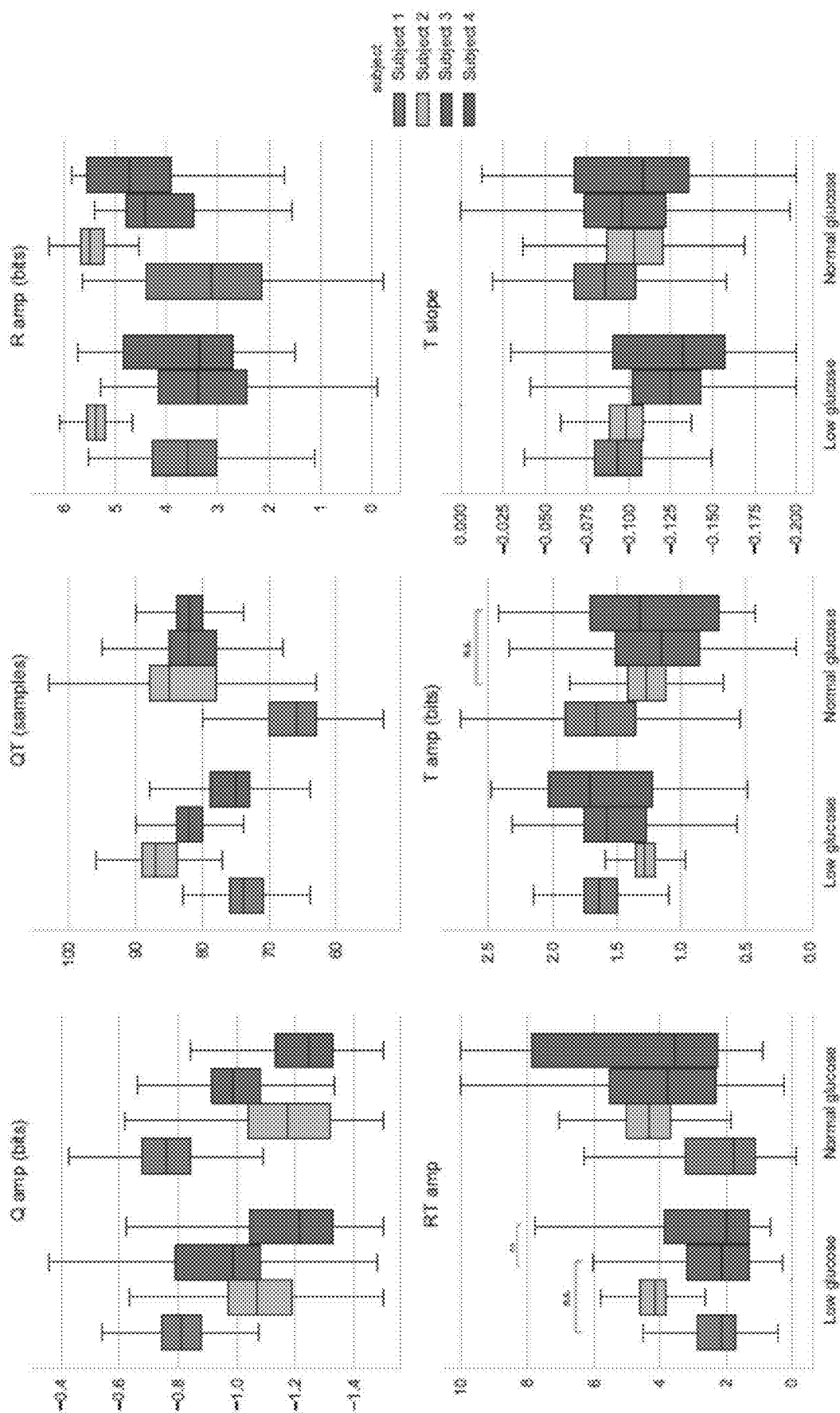
FIG. 14 are box plots for the extracted ECG features during Low and Normal glucose levels for every participant; a multi-way Kruskal-Wallis H-test was performed for every ECG parameter for the low and normal glucose condition separately. The only non-significant differences between the groups are indicated in the plot n.s.
Figure 15:
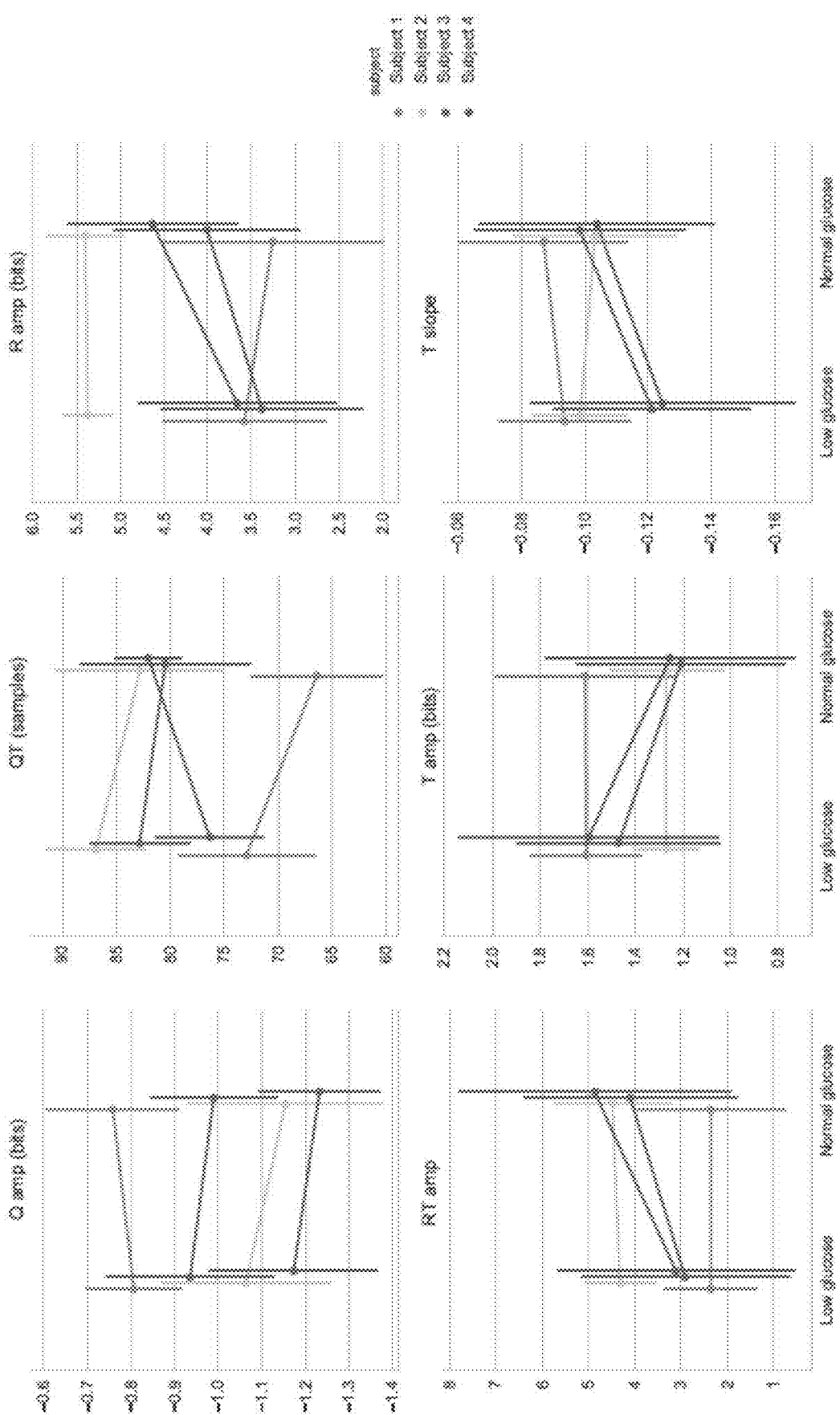
FIG. 15 are point plots for the extracted ECG features during Low and Normal glucose levels for every participant, showing the relationship between the mean of every ECG feature for low and normal glucose levels.

The Mann-Whitney rank test revealed that for all the extracted ECG features corresponding to low and normal glucose heartbeats there were significant differences (p-value <0.01), detailed results presented in FIG. 16. The inter-subject statistical tests showed that the ECG features extracted from low and normal glucose heartbeats were also significantly different between subjects, as shown in FIG. 14 and FIG. 15. Comprehensive results of this analysis can be found in the table shown in FIG. 13, and in FIGS. 14 and 15, and confirmed the hypothesis that a personalised approach was required.

Discussion

The results of this study have shown that hypoglycemic events can be automatically detected using a few ECG heartbeats recorded with wearable devices in free-living conditions using personalized classifiers based on deep-learning artificial intelligence algorithms. Those results confirmed the two hypotheses stated hereinbefore, showing that both heartbeat morphology and the sequence of heartbeats are important for the low glucose detection during the night. These findings are aligned with clinical studies that presented the predilect cardiac changes occurring during low blood glucose levels, in both healthy and diabetic: prolonged QT interval, increase in the R/T amplitude. In addition, the present study shows that it is possible to build a personalized system that can automatically learn patterns in the ECG heartbeat, discriminating between heartbeats recorded during low or normal glucose levels. The use of personalized approaches resulted necessary, given the significant inter-subject variability in ECG morphology. As explained hereinafter, the analysis is restricted to night-time recordings, where detection of hypoglycemic event is useful and also to minimize the influence the circadian rhythm of the cardiac repolarization that normally lengthens during the night. The results demonstrate that the proposed CNN based system could accurately detect 10-minutes long low-glucose events with high specificity (average 81.7%) and sensitivity (average 87.5%), as presented in Table Ia above. These results advance the idea that no manually extracted features are required to perform this task, since deep-learning methods (i.e. CNN) are able to automatically learn highly discriminative features from the raw ECG signals. This is important in the proposed task, since feature-based methods are highly dependent upon the correct heartbeat segmentation, where a precise determination of the QT interval would require ECG recording with high signal-noise ratio that is difficult to measure in real-life and can only be obtained in controlled environments. Thus, the method presented in the current study seems to be particularly effective for real-life settings.

In addition, extra information regarding the sequence of the heartbeats can be captured and presented by combining a CNN with an RNN. The CNN was used to transform the input ECG beats into embeddings that were further aggregated over time by an RNN cell, capturing the part of information that was enclosed in the ECG time-sequence, which otherwise would have been lost. The predictions for this setup were generated every 5-minutes as the input to the CNN+RNN were the extracted heartbeats in a 5-minute ECG excerpt. The results over 10 min showed that the CNN+RNN model performed on average better than the simple CNN based system, considering (Table IIa) sensitivity (average 84.7%), specificity (average 84.5%) and from the visual inspection of the prediction plots presented in FIGS. 3a to 3d. Filtering out the glucose events shorter than 5 minutes might also contribute to the improved performance over the CNN-based system. Disregarding low glucose events shorter than 5 minutes agrees with findings that a low glucose event should last for a couple of minutes to be considered a true hypoglycemic event and that very short falls in glucose levels do not reveal the related changes in the ECG signal. Moreover, from the visual inspection of the predictions during the night, it can be observed that the regions affected by higher uncertainty (i.e. closer to the threshold of 4 mmol/L) were better classified by the CNN+RNN model, which therefore was considered more resilient.

Herein, a personalized system is disclosed to detect low glucose levels in real-life settings, using the raw ECG signal. Thus, a direct comparison of the obtained results with existing literature is not straightforward. Other studies attempted to detect hypoglycemia through non-invasive monitoring using the physiological parameters of the ECG signal. Studies co-authored by Prof. Hung T. Nguyen (for example, S. H. Ling, P. P. San, H. K. Lam, and H. T. Nguyen, "Hypoglycemia detection: multiple regression based combinational neural logic approach," Soft Comput., vol. 21, no. 2, pp. 543-553, January 2017) involved nocturnal hypoglycemia detection in 15 type 1 diabetic children using different machine learning techniques (extreme learning, hybrid swarm optimization, neural networks, genetic algorithms, and a few others), using as inputs different ECG parameters computed from 5- or 10-minute ECG excerpts, and achieving interesting sensitivity and specificity. For example, the more recent studies, proposed models based on a neural logic approach, obtaining 79.07% sensitivity and 53.64% specificity, deep belief network approach, obtaining 80% sensitivity and 50% specificity, models based on extreme learning approach, obtaining 78% sensitivity and 60% specificity. As already emphasized, a direct performance comparison with those studies is not viable as the model proposed herein is person-specific, which, explains superior results. In fact, as demonstrated in FIG. 4, individual ECG response to low-glucose levels varies significantly among different subjects. This affects significantly the classification performance when trying to build a model that can generalize the discriminative features for different individuals. Also, the present study concerned the detection of nocturnal non-induced low glucose levels in healthy individuals, several clinical studies showed that cardiac changes can have different intensities in healthy, type 1 and type 2 diabetic persons.

Free-living inferential modelling of glucose levels using non-invasive inputs has been proposed that was developed and validated on a single type 2 diabetic person using 25 days of recordings. Reference is made to D. K. Rollins et al.: "Free-living inferential modeling of blood glucose level using only noninvasive inputs", J. Process Control 20, 95-107 (2010). The study presents preliminary evidence that certain food, activity and stress levels affect the blood glucose concentration and using a vast set of physiological signals together with nutrition information can advance the possibility to infer the blood glucose concentrations. The study reported that 90% of the glucose predictions were in zone A of the Clarke error grid, which defines a prediction with less than ±20% error. Moreover, the study showed that activity level plays an important role for predicting the glucose concentrations, information that was also integrated into the CNN based system, as an extra neuron appended in the fully connected layers of the CNN.

An advantage of using CNNs based system for the heartbeats classification is the possibility of producing visual explanations for network's decisions, thus making the CNN more transparent. It is showed that employing a CNN in conjunction with different techniques such as CAM or Grad-CAM could produce a coarse localization map by using the gradient of the target class with respect to the feature maps of the last convolutional layer, highlighting the important regions or subsequences in the input time series for making a certain prediction. This was important in order to show to clinical partners which segment of the ECG excerpt contained the key information utilized by the AI system. This aspect is important, as clinicians, which are ultimately the responsible for the clinical decisions, may lack of trust in black-box AI systems. Revealing and explaining how the proposed models reached certain conclusions not only makes the models more transparent but can also disclose interesting information about the underlying data. In the current context of low glucose detection through ECG heartbeat analysis, certain predilect subsequences in the input signal were highlighted as contributing the most to the CNN's decision. The regions indicated by the CNN as important for the classification (i.e., associated with hypoglycemic events) can be clearly presented to the clinicians, allowing the interpretation of underlying physiological mechanisms and driving, in future, personalised interventions. Previous studies observed the heartbeat changes associated with hypoglycemic events, but mainly during hyperinsulinemic clamps, thus both normal glucose levels and low glucose levels could be perfectly controlled and set to specific levels. For instance, J. L. Marques "Altered ventricular repolarization during hypoglycaemia in patients with diabetes," Diabet. Med. J. Br. Diabet. Assoc., vol. 14, no. 8, pp. 648-654, August 1997. considered 3 mmol/l as hypoglycemic level and 5 mmol/l as euglycemic level in type 1 diabetic subjects, Laitinen et al. "Electrocardiographic alterations during hyperinsulinemic hypoglycemia in healthy subjects", Ann. Noninvasive Electrocardiol. Off. J. Int. Soc. Holter Noninvasive Electrocardiol. Inc 13, 97-105 (2008) considered the same limits but in healthy subjects. The common, statistically significant finding in both studies was the lengthening of the QT interval during hypoglycemia. The results presented in FIGS. 4a to 4d can be interpreted in agreement with this finding, as in all 4 subjects the T-wave was coloured as being important for both classification tasks (i.e. detecting low or normal levels). T-wave flattening was found to be another significant characteristic of hypoglycemia in Laitinen et al. ibid. and few other studies. The results reveal that the changes in the T wave amplitude are personal, for subjects 3 and 4, the mean T-wave amplitude is even higher for low glucose heartbeats than for normal glucose heartbeats. It is believed that the reasons for this finding are manifold. Firstly, the considered subjects in the current study were healthy and the experiment was carried out in free-living conditions, thus in very sparse occasions, the glucose levels dropped below 3.8 mmol/l. In connection to this, it has been shown that during spontaneous night-time hypoglycemia in type 1 diabetic patients the cardiac repolarization changes are not that intense as during induced hypoglycemia. Also, the CGM device used in the present study to record the ground truth glucose levels were shown to have an overall absolute error difference of 11.4% against capillary blood glucose reference 6, thus some of the heartbeats could have been annotated incorrectly due to the error in CGM readings. Another limitation introduced by the CGM is the glucose reading lag which was reported to be 4.5±4 min, however, in the current study, the reading lag 5 minutes independent of the time, activity or food intake was accounted for. Further research could be carried out to investigate whether drops in potassium levels are coincident with spontaneous glucose falls in healthy, as it is has been shown that low potassium can also determine the flattening of the T-wave.

Interestingly, FIGS. 4a to 4d reveal that during low glucose levels, the P-wave is more pronounced in some of the subjects (subject 1 and 4) and that P-wave might be important for low glucose detection.

The unsupervised clustering of the heartbeats corresponding to low and normal glucose levels using the t-SNE method, presented in FIG. 5, indicate that the CNN network is capable of automatically learning high-dimensional discriminative features. These results demonstrate that the learned feature space can be used to visualize and organize the input data. Data visualization techniques such as t-SNE can help to inspect the input data and the model, as the similarity of inputs in the original space (thus of the input heartbeats) is also preserved in the obtained low-dimensional space. FIGS. 5a and 5b show that the learned embedding can separate the heartbeats according to the glucose level. Moreover, the heartbeats corresponding to the glucose extremes: low and high form better-defined clusters, showing that for heartbeats confidently associated with a certain class the heartbeats are correctly, further separated.

The statistical tests confirmed the need for the development of personalised hypoglycemia detection systems. Moreover, the results provided additional evidence for the less accurate systems developed in the past, that used a pool of ECG features extracted from a cohort of subjects (~15 subjects) to develop different statistical models for hypoglycemia detection. As expected, the results from our statistical analysis showed that the inter-subjects ECG features differences were statistically significant. Therefore, we argue that accurate hypoglycemia alarming systems based on ECG analysis can be developed using personalised ECG-based representation learning methods. Moreover, the personalised approaches proposed in this study showed significant performance improvement in detecting low glucose events over the previous, non-personalised systems.

Given the compelling performance on detecting nocturnal lower glucose levels events in healthy individuals using the ECG signal, the deep learning-based methods similar to the proposed ones in this study may be helpful in advancing the understanding of electrocardiographic changes induced by the glucose levels variations. Analysis, as demonstrated here, can lead to a better understanding of the underlying processes that determine certain changes in the input heartbeat during low glucose levels. ECG alterations can be used for building a real-time alarming system for low glucose events that occur during the night. The obtained results demonstrate superior performance in detecting low glucose levels in comparison to other similar studies, although due to protocol differences the results cannot be directly compared.

The person-specific framework it is proposed for detecting low glucose levels in healthy subjects may be utilized in real-life applications as it involved a few pre-processing steps and it does not require any expert annotations or feature engineering. The results show that leveraging deep learning methodologies for the analysis of ECG in order to detect low glucose events can open new possibilities to develop innovative alarming technologies that might help individuals, especially diabetic patients to better control their blood glucose concentrations. Alerting the user in real-time when glucose levels fall below a critical threshold value will facilitate the management of hypoglycemia events and can prevent the development of other severe, life-threatening episodes. Therefore, the proposed system creates the potential for long-term improvements in clinical outcomes, especially in diabetic patients. Moreover, providing personalized insights into the heartbeat morphological changes during hypoglycemia might be also utilized as a clinical decision support system.

Finally, this pilot study must also be seen in the light of its limitations, which also represent important calls for future research avenues. Firstly, additional tests should be performed on a larger population, including diabetic patients to further validate the present results. Secondly, the proposed framework can be easily extended to include other physiological signals that might influence the glucose variation such as activity levels, temperature, skin conductivity or nutrition information that might further improve the performance of the system. For diabetic patients, that will use finger pricks to check their actual blood glucose levels, implementing online training techniques is essential, as the system should be able to also learn continuously, from new data.

Methods

Protocol

Eight healthy volunteers that were not taking any medication were monitored without any constraints on diet or lifestyle between 8 and 14 consecutive days. Four participants were excluded from the study, due to a shortage or lack of hypoglycemic events, as defined in the exclusion criteria presented in the following paragraphs. The study protocol was approved by the Ethics Committee of the University of Warwick, UK, and each person enrolled gave written informed consent to participate. Nominal 24 h ECG was recorded with wearable commercial devices (Medtronic Zephyr BioPatch™ HP58), with a sampling ECG frequency of 250 Hz. The ECG monitor can store up to 3 days of ECG recordings, its battery can last for 36 hours and can be fully charged in less than one hour. Therefore, each volunteer was given two devices and instructed to change it approximately each 24-hours before showering. The Zephyr records also 3-axis accelerations and breathing waveform. Based on the raw accelerations an activity parameter was computed and logged by the device @1 Hz, measured in vector magnitude units (VMU), a parameter that was also included in the proposed framework in addition to the ECG signal.

Continuous glucose levels were measured using FreeStyle Libre Flash glucose monitoring system, which measures the interstitial glucose every 15 minutes. Each glucose sensor can be used for up to 2-weeks, also while showering, and according to the producer does not require any calibration with finger pricks. Factory-calibrated flash glucose monitoring system (FreeStyle Libre) was used as baseline glucose levels readings in the study, given the real-life requirement. The FreeStyle Libre system is clinically proven to be accurate, stable and consistent over 14 days compared to blood glucose testing without the need for finger prick calibration. In a clinical study involving 72 type 1 and type 2 diabetic patients, the FreeStyle Libre system achieved 11.4% Mean Absolute Relative Difference (MARD) compared to blood glucose testing and 99.7% of glucose results fall within Zone A and Zone B of the Consensus Error Grid, when compared against blood glucose testing. A comparative study assessing 17 point-of-care glucose meters, showed that the accuracy varied widely from 5.6% to 20.8% MARD, therefore providing evidence that the CGM accuracy is comparative to the accuracy of the point-of-care glucose meters. Moreover, in July 2018 the Food and Drug Administration (FDA) approved the FreeStyle Libre device, the decision came after Abbott published a clinical trial involving 95 subjects, which found that patients who used the scanner frequently had improved glycemic control and less hypoglycemia, reporting an overall MARD of 10.1% compared to blood glucose testing. Moreover, the CGM readings in this study were used to assess whether the glucose levels dropped below a threshold and therefore the interest was not in the actual value of the glucose.

During the 24 hours period, the ECG sensor was typically removed during showering and during high-intensity activity (usually training/workout) which may cause the electrodes to loosen due to sweat or movement of the sensor which can also introduce extra noise in the ECG recordings. Therefore, the available ECG data is variable for each participant during a 24 hours window of time. Some glucose readings might be also missing as the sensor requires to be scanned at least once every 8 hours, in case of a missing scan the data that exceeded 8 hours was not logged. Moreover, the first and the last days of recordings were disregarded from the analysis as studies that investigated the CGM performance showed that the accuracy of the glucose recordings is the lowest in the first day and that it also decreases towards the end of the recording period.

Furthermore, as mentioned earlier, this study concerns the detection of nocturnal (midnight to 9 AM) low glucose events, although the continuous ECG and glucose recordings were collected almost continuously during a 24-hour period. There are two main arguments for this choice. Firstly, only in few participants (two), the recorded glucose levels dropped below the considered low threshold during the daytime, but still the available low events were not enough in order to develop and validate the proposed system. Secondly, it is known that the cardiac repolarization has a circadian cycle that normally lengthens during the night. Therefore, it is extremely important to consider whether the ECG changes reflect some circadian physiological alterations or they are indeed induced by the lower blood glucose concentrations. Therefore, due to the expected ECG circadian changes and the shortage of low glucose events during the day, it was decided to consider for the analysis only the data that was recorded during the night. To ensure that the low glucose detection model does not capture just the associated circadian ECG changes the analysis was limited in this study to the night period.

Dataset

ECG excerpts of 15 minutes were annotated as corresponding to normal or low glucose according to the CGM readings. Since the present study focused on healthy participants monitored in real life (i.e., no induced low levels via clamping), lower glucose level (i.e., LGL) episodes were defined as glucose concentration values lower than 4 mmol/L. A normal glucose level (NGL) was defined as a glucose concentration between 4 mmol/L and 7.5 mmol/L, as per international guidelines 64. In order for a subject to be included in the analysis, at least 10% of their recorded glucose values were expected to be less than the LGL threshold plus a small error of ~0.2 mmol/L (to account for the CGM reading error), thus less than 4.2 mmol/L. Moreover, the glucose value that corresponds to the 80th percentile of the recorded glucose values was expected to be less than the NGL threshold. Thus, the percentiles condition represents an additional check that the person is healthy, and that the majority of the glucose levels recorded during consecutive nights lie between the expected values.

The complete dataset comprises of ECG and glucose recordings for 8 participants that worn the two sensors between 8 and 14 days. Four participants were excluded from the analysis because their glucose levels did not go below the established threshold of 4 mmol/L for the low glucose (subjects 5, 6, 7), essentially, they did not experience low glucose events or very few that were not enough to satisfy the condition that at least 10% of the recorded values should be <4.2 mmol/L (subject 8). Moreover, after being enrolled in this study subjects 5 and 6 were diagnosed as being pre-diabetic, finding that is also reflected by the high glucose values recorded by the CGM. Therefore, the remaining 4 subjects included in the analysis were subject with IDs 1, 2, 3 and 4.

CNN Based System Dataset

The final dataset used for building and testing the CNN based system comprised of a list of ECG heartbeats each having associated 2 additional parameters: an activity level and the corresponding glucose value used as output. To account for the reported average lag time of the FreeStyle Libre system readings, which is known to be approximately 5 minutes, each heartbeat was associated the glucose value that corresponded to the current timestamp of the heartbeat plus 5 minutes. Moreover, the heartbeats that corresponded to glucose levels between 4 and 4.2 mmol/L were not considered during training. This measure ensured that no consecutive heartbeats, therefore very similar heartbeats, would be considered as both low and normal and most importantly had the effect of reducing overfitting. For each participant the recording nights were split into 2 separate datasets for training and testing the model, ensuring that every dataset contained nights with low blood glucose events. An additional validation dataset was created by randomly resampling without replacement 20% of the heartbeats included in the training dataset. The final number of extracted heartbeats for each participant corresponding to the normal and low blood glucose levels is presented in Table III.

TABLE III

| Subject ID | Number of heartbeats | | | | Number of recording nights (nights with low glucose events) | |
|---|---|---|---|---|---|---|
| | Training | | Testing | | Training | Testing |
| | Normal | Low | Normal | Low | | |
| 1 | 37042 | 38798 | 35991 | 22216 | 3 (3) | 3 (3) |
| 2 | 51026 | 18266 | 68941 | 6321 | 4 (3) | 4 (3) |
| 3 | 92261 | 21844 | 69533 | 5053 | 6 (2) | 4 (1) |
| 4 | 28342 | 34491 | 46345 | 13544 | 4 (3) | 4 (2) |
| Average | 52168 | 28350 | 55203 | 11784 | 4.3 (2.8) | 3.8 (2.3) |

When the number of low glucose beats was less than 25% of the number of normal ones during training, the majority class was randomly down sampled without replacement. No other specific methodology (such as oversampling, cost-sensitive learning) was employed for balancing the dataset. The validation dataset was used to monitor the training and to early stop, in case the Area under the ROC curve (AUC) evaluated at every 100 steps did not improve in the next 10 evaluations. The best model as evaluated on the validation set was saved during the optimization process RNN Based System Dataset The same recording nights were used for building and testing the CNN+RNN system. Instead of considering the individual heartbeats as inputs, the inputs into the RNN network represent the sequence of the first 200 consecutive heartbeats from a 5-minute non-overlapping ECG excerpt. To ensure that each 5-minute ECG excerpt corresponded to a glucose event: either low or normal, the glucose events that did not last for 5 minutes were filtered out. In fact, if a low glucose event is shorter than 10 minutes most probably it is caused by an inaccurate glucose reading (thus most probably an outlier). Moreover, to ensure that the HR in the 5-minute ECG excerpts >40 bpm, only those 5-minute ECG intervals that contained at least 200 heartbeats were included in the analysis. Similarly, the heartbeats corresponding to glucose values between 4 and 4.2 mmol/L were not considered for training the model. Table IV presents the final number of 5-minute ECG segments that were selected and included in the training and testing datasets.

TABLE IV

| Subject ID | Number of 5-minute ECG excerpts | | | |
|---|---|---|---|---|
| | Training | | Testing | |
| | Normal | Low | Normal | Low |
| 1 | 130 | 119 | 118 | 69 |
| 2 | 275 | 64 | 315 | 22 |
| 3 | 409 | 86 | 317 | 17 |
| 4 | 149 | 122 | 217 | 53 |

Data Pre-Processing

Since this study investigated the association between ECG beat morphology and glucose levels, the first step was to isolate each heartbeat. This was achieved by detecting a fiducial point (i.e., the R peak) and then selecting a window of time of 640 ms around the fiducial point, in analogy to 43 and accounting for the sampling frequency. The fiducial point for each heartbeat was detected using a QRS detection algorithm as proposed in 65. Since the ECG were sampled at 250 Hz, a window of time of 640 ms was isolated counting 160 ECG samples around the R fiducial point (i.e., 60 samples preceding the R peak and 100 samples following the R peak). Two parameters logged by the Zephyr BioPatch were used to filter the noisy ECG segments: heart rate confidence and the ECG noise. According to the device's specification, the HR confidence takes into account a worn detection indication and the signal-to-noise ratio of the ECG signal. In the current study, ECG excerpts with 100% HR confidence and ECG noise <0.001 were extracted and considered for the beat extraction and further for the analysis. After the heartbeats were isolated, they were z-normalized and downsampled, keeping only the kth sample (with k=3). Thus, the final length of the heartbeat time series was 53 sample points.

CNN Network

The CNN network was implemented in TensorFlow and reference is made to M. Abadi et al.: "TensorFlow: Large-Scale Machine Learning on Heterogeneous Distributed Systems" (2015).

The CNN comprises of 15 convolutional layers with a fixed number of 50 filters in each layer, in agreement with previous published models and one fully connected (FC) layer of 30 neurons. The activity level information that was associated with each heartbeat was also included in the CNN network as an additional neuron in the FC layer, as shown in FIG. 1. The network was trained from scratch, initialising the weights of the convolutional layer as in using the Xavier initialiser. Reference is made to X. Glorot & Y. Bengio: "Understanding the difficulty of training deep feedforward neural networks", Proceedings of the Thirteenth International Conference on Artificial Intelligence and Statistics 249-256 (2010).

The sizes of the filters used were kept constant being set to 3, that represents around 5% of the input time series length (53 samples). The employed loss function was the cross-entropy between the estimated class probabilities and the target classes. The chosen optimizer was AdamOptimizer with an initial learning rate of 1e-4. Reference is made to D. P. Kingma & J. Ba: "A Method for Stochastic Optimization", in Proceedings of the 3rd International Conference on Learning Representations (2015).

Batch normalisation was employed after each convolution and before the ReLU activation. No pooling operation was used except a 0.5 rate dropout after the fully connected layer. The maximum number of training iterations was set to 2.5e+4 which represents at least 45 epochs considering a mini-batch of 200 input beats, for all the participants. Reference is made to V. Nair & G. E. Hinton "Rectified Linear Units Improve Restricted Boltzmann Machines", Proceedings of the 27th International Conference on International Conference on Machine Learning 807-814 (Omnipress, 2010)

Due to the high flexibility of the CNN structure and the high number of hyper-parameters, a combination of architecture and hyper-parameters in an iterative process were evaluated, using grid-search and manual tuning. Regarding the architecture structure, a search was performed over the number of convolutional layers (3 to 20), different filter sizes (from 3 to 20) and the number of filters in each convolutional layer (20 to maximum 100). The learning rate was manually tuned in order to achieve a faster convergence; the considered values were $\{10\text{-}1 \text{ to } 10\text{-}5\}$. The results presented in herein were obtained on the final CNN architecture that achieved the highest performance on the validation dataset, that also minimized the number of parameters.

CNN+RNN Network

The CNN+RNN based system leverages the representation power of the CNNs and connects the obtained representations to a recurrent neural network in order to also capture temporal dependencies between the input heartbeats. Specifically, due to the known exploding or vanishing gradients problems the RNNs, the recurrent block comprises of long short-term memory (LSTM) cells. The CNN+RNN model works by passing each input (individual heartbeat, $b_i$) through a feature transformation $\phi_V$ with parameters V, which in this case is a CNN network, to obtain a fixed-length vector representation. The outputs of $\phi_V(b_i)$ are then passed into a recurrent sequence learning module (i.e. an LSTM network). The recurrent network in a very general form, has parameters W and maps an input $b_t$ and a previous hidden state $h_{t-1}$ to an output $z_t$ and an updated hidden state $h_t$. The final system is instantiated with a sequential input (the consecutive heartbeats extracted from a 5-minute ECG excerpts) and has a static output generated only at the last sequence step, which is the glucose event associated with every 5-minute interval $(b_1, b_2, \ldots, b_{200}) \rightarrow y$ (low/normal glucose). To predict a distribution over the outcomes y, at time step t, the outputs $z_t$ of the sequential model are passed through a linear prediction layer, outputs of which are passed through a softmax function to obtain the final class probabilities.

The CNN module comprises 5 convolutional layers each having 50 filters of size 3. The LSTM module comprises a single LSTM layer with 400 units in each LSTM cell and 200-time steps. The weights initializer for both CNN and LSTM parameters was Xavier initializer and all biases were initialized to 0. The CNN+RNN network was trained end-to-end through backpropagation and it was found that a higher dropout (0.6) was needed to avoid overfitting. The batch size was 30, the initial learning rate was set to 1e-4 and the used optimizer was AdamOptimizer.

Performance Evaluation

The performance measures used for both models (CNN and CNN+RNN) assessment were accuracy, sensitivity, specificity, and AUC. In addition, from the clinical perspective, sensitivity is considered more relevant than specificity as it shows how well the event was identified (in this case the low glucose events), thus when comparing different models, specificity was considered more important.

When training the model, the inputs of the CNN represent the isolated heartbeats, however, the CNN based model does not account for the sequence of beats in a specific timeframe. In case of a real-time alarming system, predicting a class for every heartbeat will be undesirable and it might be difficult to follow, instead, generating a prediction every 10 minutes is more feasible and closer to the resolution of the CGM devices. For this reason, the model's performance in a 10-minute window of time was evaluated by taking the majority class of the heartbeat predictions in that specific timeframe. The same voting strategy was also applied to the CNN+RNN model.

Localization of the Contributing ECG Beat Subsequences with Grad-CAM

In order to obtain the class-discriminative localization map in a generic CNN architecture, the Grad-CAM method was employed as described in R. R. Selvaraju ibid.

The method implies the computation of the gradient of $y^c$ with respect to feature maps A (in this case the feature maps of the last conv layer) that are global-average-pooled to obtain the weights $\alpha^c_k$ similar to the weights $\omega^c_k$ computed with the CAM method. The weights $\alpha^c_k$ $$\alpha^c_k = \frac{1}{m} \sum_i \sum_j \frac{\partial y^c}{\partial A^k_{ij}} \quad (3)$$

capture the importance of feature map k for a target class c. The Grad-CAM heatmap is obtained as a weighted combination of feature maps. Grad-CAM is a generalization of CAM and can be used in conjunction with any CNN architecture with fully-connected layers.

Visualization of the Data in Lower Dimensional Space

A nonlinear dimension reduction method is used to visualize the data in a lower dimensional space, in particular, t-distributed stochastic neighbour embedding (t-SNE). t-SNE was applied to the heartbeat embeddings as obtained from the fully connected neurons in the CNN based model.

Statistical Analysis

A series of key ECG parameters were extracted for all the heartbeats included in the train and test datasets. The extracted parameters included: the amplitude of the Q, R, T waves, the QT interval (measured from peak to peak), the RT amplitude (as a ratio of R-wave and T-wave) and the T wave slope (slope of the line that intersects T wave peak and T wave offset point). As T wave could not be accurately detected for all the extracted heartbeats, the heartbeats that could not be fully segmented were excluded from the analysis. Furthermore, the number of low and normal heartbeats was balanced by randomly downsampling the heartbeats corresponding to the majority class. The total number of heartbeats included in the statistical analysis for each subject were (N=29732, 14276, 40642, 30998) corresponding to (subject 1, subject 2, subject 3 and subject 4).

Two non-parametric statistical tests (the condition for normality checked using the Shapiro-Wilk test was violated) were performed to assess both intra- and inter-subject ECG features variability. Therefore, Mann-Whitney rank test was conducted to test the changes in the individual ECG features between low and normal glucose levels. To test the changes in the ECG parameters between subjects, a multi-way Kruskal-Wallis H-test was performed for each ECG parameter for low and normal glucose condition separately. A significant four-way interaction between the four subjects indicated that the ECG feature changed significantly for one or more subjects, without specifically indicating between which subjects the ECG features were significantly different. Therefore, to further investigate the pairwise differences between subjects, a post hoc comparison was performed with a two-way Kruskal-Wallis H-test and Dunn's test. A p-value <0.05 was accepted as evidence of statistical significance.

Programming

The deep learning models were developed in Python employing different libraries such as TensorFlow, Numpy, Pandas, and trained on an Intel Core i7 processor with 32 GB RAM. To speed up the training, a High-Performance Computing facility was used i.e. 4 GPU nodes (each having 2×NVIDIA Tesla K80 GPU cards) provided by the Centre for Scientific Computing (CSC) at University of Warwick.

Monitoring System

The systems hereinbefore described can be used to provide an electrocardiogram-based blood glucose level monitoring system.

Figure 6:
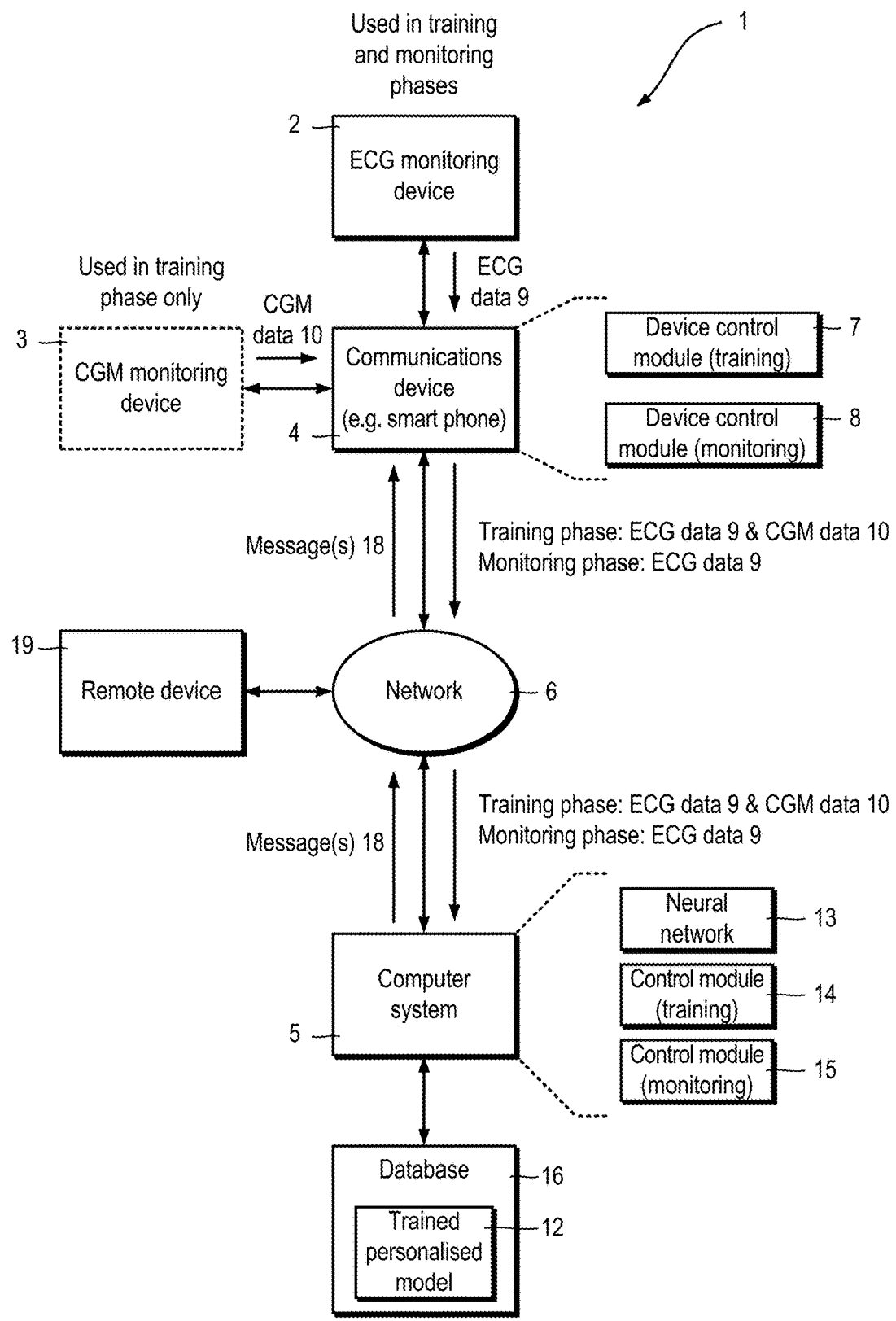
FIG. 6 is a schematic block diagram of a system for training a model and monitoring blood glucose level using the model.

Referring to FIG. 6, the blood glucose level monitoring system includes an ECG monitoring device 2, a glucose monitoring device 3 which is used for a training phase (but not during a monitoring phase), a communications device 4 and a computer system 5.

The monitoring device 2 and communications device 4 are preferably mobile devices which are in wireless communication. For example, the monitoring device 2 preferably takes the form of a non-invasive, wearable device, such as a smart watch, and the communications device 4 preferably takes the form of a smart phone or other mobile communications device (such as a tablet computer). In some cases, the monitoring device 2 and communications device 4 may be integrated into a single device.

The communications device 4 and the computer system 5 are in communication via a communications network 6, such as the Internet. Typically, the communications device 4 and the computer system 5 are remotely located from each other.

The communications device 4 includes a first control module 7 to be used during a training phase which controls, among other things, data transfer during training and a second control module 8 to be used during a monitoring phase which controls, for example, a low blood glucose level alarm.

As will be explained in more detail later, in a training phase, ECG monitoring device 2 gathers ECG data 9 and the CGM device gathers glucose level data 10 for a given subject over a period of time, typically lasting at least one day and preferably lasting at least two days. Other data 11, for example, relating to activity, may be gathered. The ECG data 9, glucose level data 10 and other data 11 for the subject is transmitted to the communications device 4 which forwards the data 9, 10, 11 to the computer system 5. The computer system 5 generates a personalised model 12 for that subject using at least one neural network 13. In a monitoring phase (also referred to herein as the "classifying phase"), the ECG monitoring device 2 and communications device 4 gather ECG data 9 for classifying either locally, for example, by the communications device 3 or remotely, by the computer system 4 or another computer system (not shown). ECG data 9 is transmitted in continuously or in batches (for example, in 5-minute samples every 5 minutes). The communications device 4 or computer system 5 classifies the electrocardiogram data 9 using at least one neural network 13 and the personalised model 12 to identify whether a low blood glucose level condition is present and, upon identifying the presence of the low blood glucose level condition, to flag an alarm condition. In the case of remote classification, if the alarm condition is triggered, then the computer system 5 transits a trigger or message 14 to the communication device 4 or another communications device (not shown), for example, that of carer or parent, which presents an alarm or notification to the user via a user interface (not shown). In the case of local classification, if the alarm condition is triggered, then the communication device 4 presents an alarm or notification to the user and may send a message, e.g. to a carer or parent. A remote device 19 may be used to access the computer system 5 to monitor or control training and/or monitoring.

Figure 7:
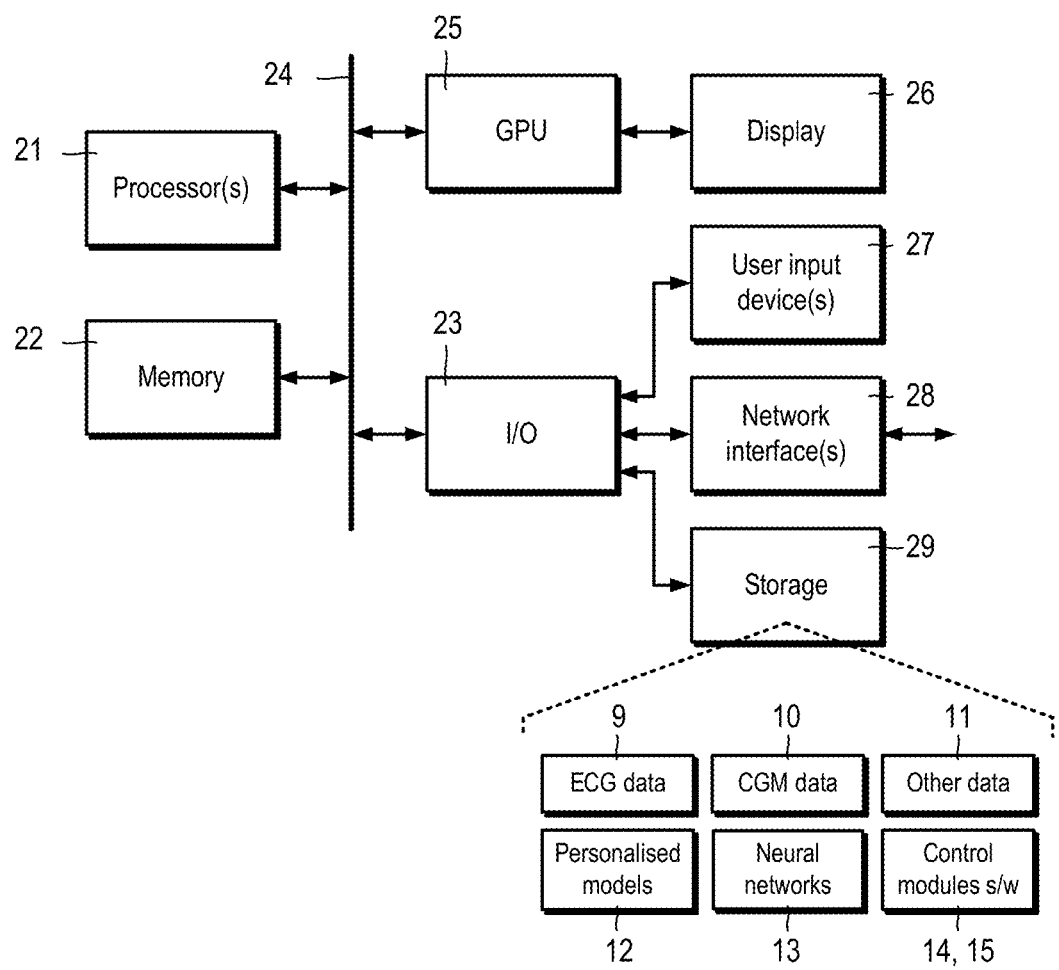
FIG. 7 is a schematic block diagram of a computer system.

Referring also to FIG. 7, the computer system 5 is shown. The computer system 5 comprises at least one processor 21, memory 22 and an input/output module 23 interconnected by a bus system 24. The system 25 may include a graphics processing unit 25 and a display 26. The system 5 includes user input device(s) 27 such as keyboard (not shown) and pointing device (not show), a network interface 28 and storage 29 for example in the form of hard-disk drive(s) and/or solid-state drive. The storage 29 for ECG data 9, CGM data 10, other data 11, such as accelerometery data, the personalised model 12, neural network 13 and control software 14, 15.

Figure 8:
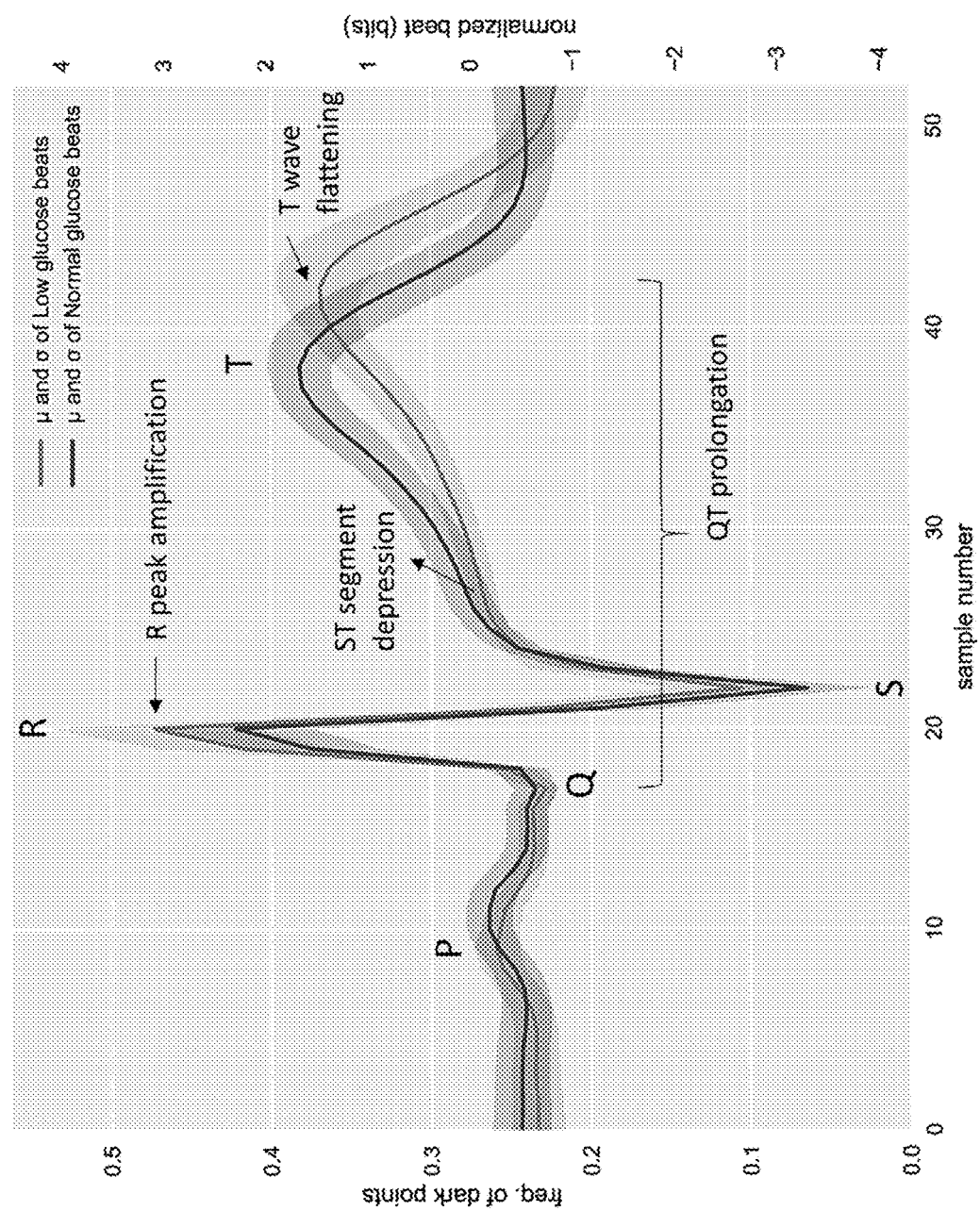
FIG. 8 illustrates heartbeat segments under different conditions.

Referring to FIG. 8, a heartbeat segment is shown.

FIG. 8 also shows how the heartbeat segment changes in the cases of euglycemic hyperinsulinemia and hypoglycemic hyperinsulinemia. In particular, the effect of euglycemic hyperinsulinemia and hypoglycemic hyperinsulinemia on P, Q, R, S and T waves are shown.

Figure 9:
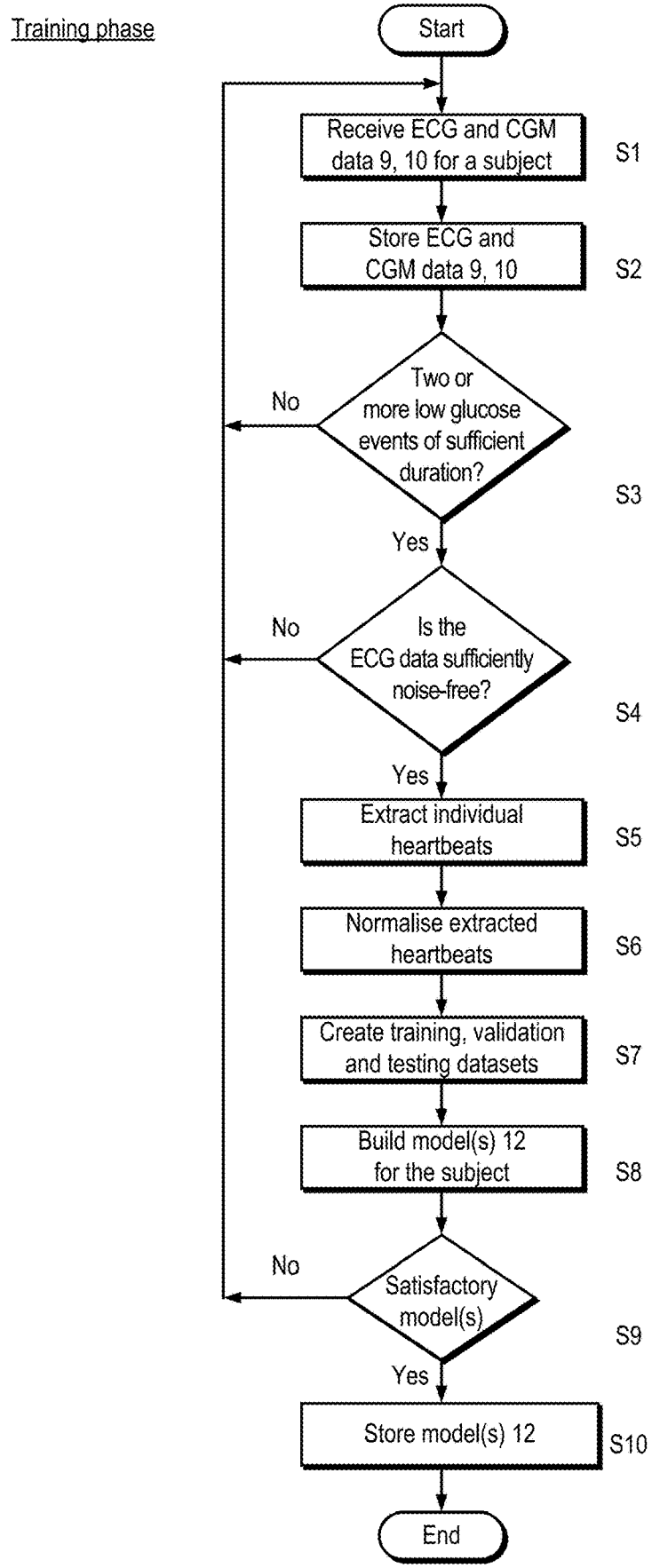
FIG. 9 is a process flow diagram of a method of operating a computer system during a training phase.
Figure 10:
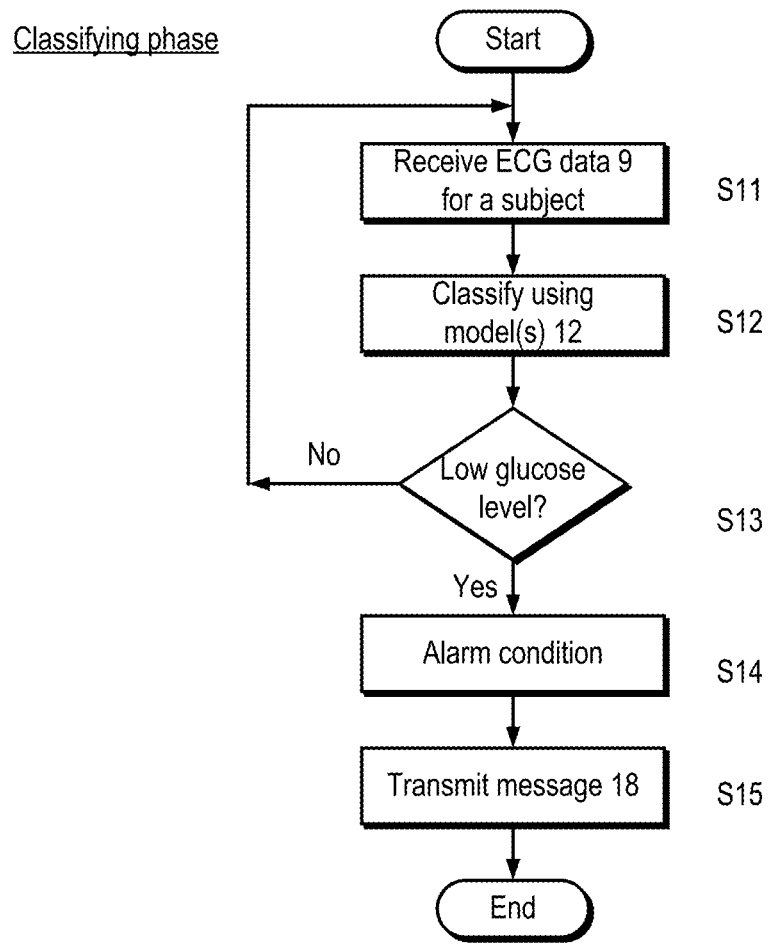
FIG. 10 is a process flow diagram of a method of operating a computer system during a monitoring phase.
Figure 12:
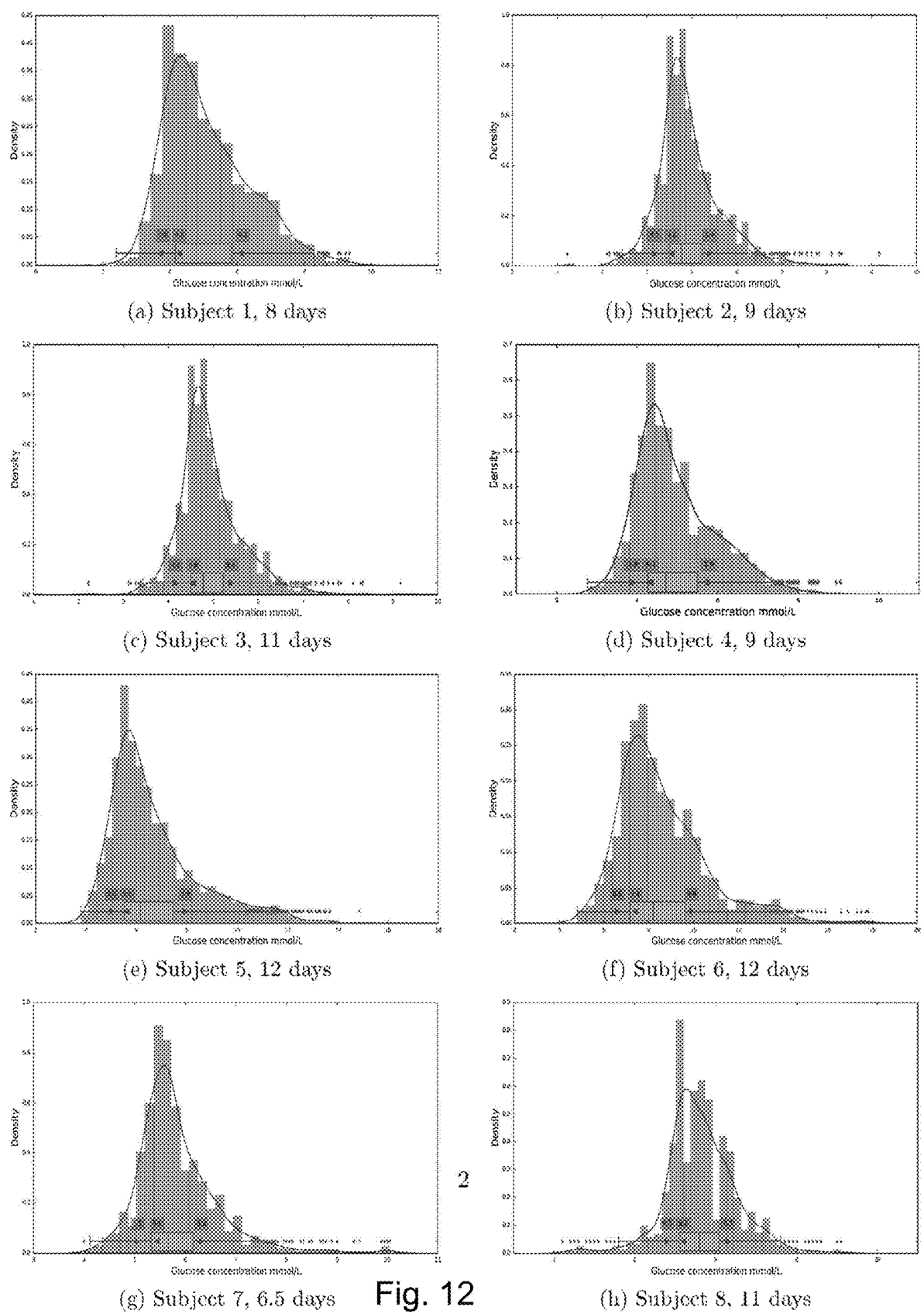
FIG. 12 is a table showing glucose histograms for all the participants during the recording nights; the marked values correspond to the $10^{th}$, $30^{th}$ and $80^{th}$ percentiles.

FIG. 9 is a process flow diagram of a method of training a model.

Referring to FIGS. 6 and 9, the computer system 5 receives and stores (training) ECG data 9 and glucose level data 10 for at least one period time for a given subject (step S1 & S2). The at least one period preferably includes two nights and the at least one period should preferably include at least two low glucose events, each lasting at least 20 minutes. The low glucose level is user-defined. The system 5 determines whether the glucose level data 10 contains two or more low glucose events lasting a sufficiently long duration (step S3). The computer system 5 determines whether the ECG data 9 is sufficiently noise free (step S4).

The ECG monitoring device 2 logs multiple parameters which reflect confidence of the recordings. For example, these parameters can include heart rate confidence and ECG noise. The heart rate confidence is a flag that can be checked for confirming the quality of the signal. Therefore, before feeding extracted raw heartbeats as inputs to the models, the ECG segments that do not satisfy a set of minimum quality threshold, for example, heartrate confidence of 100% and ECG noise less than 0.001, are discarded. The heartrate confidence is usually lower than 100% when the electrodes were not properly attached or (due increased activity) sweat, (due to hair) poor conductivity.

If the ECG 9 is sufficiently noise free, then the computer system 5 extracts individual heartbeats (step S5) and normalises the extracted heart beats (step S6). Further details can be found in S. Yazdani et al.: "A Novel Short-Term Event Extraction Algorithm for Biomedical Signals", IEEE Trans. Biomed. Eng. 65, 754-762 (2018). Normalization, this was mentioned in data pre-processing section. Normalisation involves z-normalization using $x=(x-\mu)/\sigma$ where $\mu$ is mean and $\sigma$ is standard deviation.

The computer system 5 generates training, validation and testing datasets (step S7).

Training and testing days are considered as consecutive recording nights. However, due to missing low glucose events in certain nights, then the low glucose events nights are split in two. If an odd number of nights contained low glucose events, then more nights are used for training. The rest of the nights (only containing normal glucose levels) are split in two. The first night for training and the following nights for testing. The validation dataset is randomly sampled from the training dataset. Thus, it contains so random heartbeats sampled from the heartbeats in training dataset.

The computer system 5 then builds model(s) (step S8) and determines whether the model(s) are satisfactory (step S9). A model may be considered to be satisfactory if sensitivity >0.75 and specificity >0.75. Higher values can be used, for example, >0.80 or even >0.90 can be used. If the model(s) is (are) considered to be satisfactory, then the model(s) 12 is (are) stored, ready to be used (step S10).

FIG. 9 is a process flow diagram of a method of monitoring a subject for a low blood glucose level condition.

The computer system 5 either continuously or in batches receives (real-time) ECG data 9 (step S1) and uses the deployed model 12 to classify the data 9 (step S12). If a low blood glucose level condition is identified, then the system sets an alarm condition (step S14) and transmits a message 18 to the communications device 4 and/or other device (step S15). Different messages can be sent to different recipients.

Modifications

It will be appreciated that various modifications may be made to the embodiments hereinbefore described. Such modifications may involve equivalent and other features which are already known in the design, manufacture and use of ECG and blood glucose monitoring and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A computer system for use in electrocardiogram-based blood glucose level monitoring, the computer system configured, in response to receiving electrocardiogram data measured over a given period of time for a given subject, to classify the electrocardiogram data using at least one neural network and also using at least one personalised model which is specific to the given subject so as to identify whether a low blood glucose level condition is present wherein blood glucose level falls below a predefined level and, upon identifying presence of the low blood glucose level condition, to flag an alarm condition.

2. The computer system of claim 1, wherein the electrocardiogram data comprises an electrocardiogram signal corresponding to a sequence of heartbeats.

3. The computer system of claim 1, wherein the at least one neural network includes a convolutional neural network.

4. The computer system of claim 1, wherein the at least one neural network includes a recurrent neural network.

5. The computer system of claim 1, which is arranged to receive the electrocardiogram data from a remote location and, in response to the alarm condition, to transmit an alarm signal to the remote location or another remote location.

6. The computer system of claim 1, which is arranged
   to receive the electrocardiogram data locally and
   in response to the alarm condition, to generate an alarm or to transmit an alarm signal to a remote location.

7. The computer system of claim 1, which receives other data and which is configured to classify the electrocardiogram data and other data.

8. The computer system of claim 7, wherein the other data include one or more of activity data, time series data, body temperature, and skin conductance.

9. The computer system of claim 1, wherein the given period is greater than or equal to 1 minute and less than or equal to 15 minutes.

10. The computer system of claim 1, which is portable and/or a server computer.

11. The computer system of claim 1, wherein the at least one neural network is based on deep learning.

12. The computer system of claim 9, wherein the given period is greater than or equal to 5 minutes.

13. The computer system of claim 1 wherein the personalised model which is specific to the given subject comprises information on a heartbeat morphology of the given subject.

14. The computer system of claim 1 wherein the personalised model which is specific to the given subject comprises information on a sequence of heartbeats of the given subject.

15. The computer system of claim 13 wherein the personalised model which is specific to the given subject comprises information on the subject's heartbeat morphology and sequence of heartbeats.

16. The computer system of claim 1, wherein the at least one neural network includes a convolutional neural network to obtain fixed-length vector representations of individual heartbeats of the given subject and a recurrent neural network including a sequence learning module, coupled to receive the fixed-length vector representations of the individual heartbeats, to provide outputs indicative of whether the low blood glucose level condition is present.

17. A blood glucose level monitoring system comprising:
   a computer system;
   an electrocardiogram monitoring device; and
   an agent device configured to receive electrocardiogram data from the electrocardiogram monitoring device and to transmit the electrocardiogram data to the computer system,
   wherein the computer system is configured, in response to receiving, from the agent device, the electrocardiogram data measured over a given period of time for a given subject, to classify the electrocardiogram data using at least one neural network and also using at least one personalised model which is specific to the given subject so as to identify whether a low blood glucose level condition is present wherein blood glucose level falls below a predefined level and, upon identifying presence of the low blood glucose level condition, to flag an alarm condition.

18. The blood glucose monitoring system of claim 17, wherein the computer system and the agent device are integrated into one device.

19. The blood glucose monitoring system of claim 18, wherein the electrocardiogram monitoring device is a non-invasive, wearable device.

20. The blood glucose monitoring system of claim 19, wherein the non-invasive, wearable device is non-intrusive.

21. The blood glucose monitoring system of claim 17, wherein the agent device comprises a mobile communications device.

22. An agent device for use in electrocardiogram-based blood glucose level monitoring comprising:
   a first network interface for receiving electrocardiogram data;
   a buffer for storing electrocardiogram data received via the first network interface;
   a second network interface for transmitting the electrocardiogram data; and
   a controller configured to cause transmission of the electrocardiogram data stored in the buffer to a computer system in response to a transmission-triggering condition,
   wherein the computer system is configured, in response to receiving, from the controller, the electrocardiogram data measured over a given period of time for a given subject, to classify the electrocardiogram data using at least one neural network and also using at least one personalised model which is specific to the given subject so as to identify whether a low blood glucose level condition is present wherein blood glucose level falls below a predefined level and, upon identifying presence of the low blood glucose level condition for the given subject, to flag an alarm condition.

23. The agent device of claim 22, capable of receiving data and which further comprises:
   a user interface;
   wherein the controller is configured, in response to receiving the alarm condition indicative of a low blood glucose level from the computer system, to activate an alarm via the user interface.

24. Apparatus for capturing and forwarding electrocardiogram data, the apparatus comprising:
   an electrocardiogram monitoring device; and
   an agent device in communication with the electrocardiogram monitoring device, wherein the agent device comprises:
   a first network interface for receiving electrocardiogram data;
   a buffer for storing electrocardiogram data received via the first network interface;
   a second network interface for transmitting the electrocardiogram data; and
   a controller configured to cause transmission of the electrocardiogram data stored in the buffer to a computer system in response to a transmission-triggering condition,
   wherein the computer system is configured, in response to receiving, from the agent device, the electrocardiogram data measured over a given period of time for a given subject, to classify the electrocardiogram data using at least one neural network and also using at least one personalised model which is specific to the given subject so as to identify whether a low blood glucose level condition is present wherein blood glucose level for the given subject falls below a predefined level and, upon identifying presence of the low blood glucose level condition, to flag an alarm condition.

25. A computer-implemented method of generating a personalised model which is specific to a given subject and for using the personalised model in electrocardiogram-based blood glucose level monitoring for the given subject, the method comprising:
receiving electrocardiogram data and blood glucose data measured over at least one period including at least one night for a given subject;
determining from the blood glucose data whether at least two low blood glucose level events have occurred during the period;
extracting individual heartbeats from the electrocardiogram data;
providing the electrocardiogram data for individual heartbeats and blood glucose data to at least one neural network;
generating the personalised model for the given subject;
storing the model:
using the personalised model with at least one neural network to identify whether a low blood glucose level condition is present for the given subject when a blood glucose level of the given subject falls below a pre-defined level; and
upon identifying presence of the low blood glucose level condition for the given subject, flagging an alarm condition.

26. The computer-implemented method of claim 25, wherein the at least two events last at least 20 minutes.

27. The computer-implemented method of claim 25, wherein the at least one period includes at least two nights.

28. The computer-implemented method of claim 25, further comprising:
filtering glucose events having a duration shorter than a pre-defined duration.

29. A computer program product comprising a non-transitory computer-readable medium storing a personalised model which is specific to a given subject for use in electrocardiogram-based blood glucose level monitoring, wherein the model is generated by:
receiving electrocardiogram data and blood glucose data measured over at least one period including at least one night for a given subject;
determining from the blood glucose data whether at least two low blood glucose level events have occurred during the period;
extracting individual heartbeats from the electrocardiogram data;
providing the electrocardiogram data for individual heartbeats and blood glucose data to at least one neural network; and
generating the personalised model for the given subject,
wherein the personalised model is configured to be used, by a computer system, with at least one neural network to identify whether a low blood glucose level condition is present for the given subject when a blood glucose level for the given subject falls below a predefined level and, so that, upon identifying presence of the low blood glucose level condition, the computer system flags an alarm condition.

30. A computer-implemented method comprising:
receiving electrocardiogram data measured over a given period of time for a given subject,
classifying the electrocardiogram data using at least one neural network and also using at least one personalised model which is specific to the given subject so as to identify whether a low blood glucose level condition is present; and
upon identifying presence of the low blood glucose level condition, flagging an alarm condition.

31. A computer program product comprising a non-transitory computer-readable medium and a computer program comprising instructions for performing a method comprising:
receiving electrocardiogram data measured over a given period of time for a given subject,
classifying the electrocardiogram data using at least one neural network and also using at least one personalised model which is specific to the given subject so as to identify whether a low blood glucose level condition is present; and
upon identifying presence of the low blood glucose level condition, flagging an alarm condition.

* * * * *